United States Patent
Clay et al.

[11] Patent Number: 5,182,659
[45] Date of Patent: Jan. 26, 1993

[54] HOLOGRAPHIC RECORDING AND SCANNING SYSTEM AND METHOD

[75] Inventors: Burton R. Clay, Wayland; David M. Rowe, Bellingham, both of Mass.

[73] Assignee: Holographix, Inc., Weltham, Mass.

[21] Appl. No.: 657,915

[22] Filed: Feb. 20, 1991

[51] Int. Cl.$^5$ .................. G02B 5/32; G02B 26/10
[52] U.S. Cl. .................... 359/17; 359/18; 359/19; 359/569
[58] Field of Search .......... 350/3.71, 3.72, 6.2, 350/6.7, 6.9; 359/16, 17, 18, 569, 19

[56] References Cited

U.S. PATENT DOCUMENTS

| | | |
|---|---|---|
| 3,630,593 | 12/1971 | Bartelt et al. |
| 3,721,487 | 3/1973 | Pieuchard et al. ........ 350/3.71 |
| 3,951,509 | 4/1976 | Noguchi et al. ......... 350/3.71 |
| 4,094,576 | 6/1978 | Heiling ............... 350/3.71 |
| 4,243,293 | 1/1981 | Kramer .............. 350/3.71 |
| 4,304,459 | 12/1981 | Kramer .............. 350/3.71 |
| 4,364,627 | 12/1982 | Haines . |
| 4,428,643 | 1/1984 | Kay ................ 350/3.71 |
| 4,505,537 | 3/1985 | Funato .............. 350/3.71 |
| 4,753,503 | 6/1988 | Day et al. ........... 350/3.71 |
| 4,790,612 | 12/1988 | Dickson . |
| 4,810,046 | 3/1989 | Yamagishi et al. ..... 350/3.71 |
| 4,904,034 | 2/1990 | Narayan et al. ........ 359/17 |
| 4,923,262 | 5/1990 | Clay ................ 350/3.71 |
| 4,957,336 | 9/1990 | Hasegawa et al. ...... 359/17 |
| 5,007,709 | 4/1991 | Iida et al. ........... 359/569 |
| 5,039,183 | 8/1991 | Meyers .............. 359/17 |

FOREIGN PATENT DOCUMENTS 0214018 3/1987 .

*Primary Examiner*—Martin Lerner
*Attorney, Agent, or Firm*—Skjerven, Morrill MacPherson Franklin & Friel

[57] ABSTRACT

A system that provides a structure which makes use of a recording geometry in which no significant Seidel induced aberrations arise. The recording geometry results in a pattern recorded on a photosensitive surface, thereby creating the hologram on the scanning disc. Reconstruction of the recorded object may be made by exposing the scanning disc to substantially monochromatic light. The hologram on the scanning disc not only directs the reconstruction beam, but also focuses it. An optical element may be used during reconstruction to correct for bow and linearity, and also optimize flatness of the focal plane. Reconstruction also involves achromatization, or correction of beam placement because of mode hops or drift in laser frequency. The reconstruction comprises both pre-scan holograms and post-scan holograms. Recording of the post-scan hologram is achieved with a plurality of lenses which possess different collimating properties in the vertical and horizontal planes. Further, a method is provided in which a scanning disc may be replicated on various transparent materials.

34 Claims, 19 Drawing Sheets

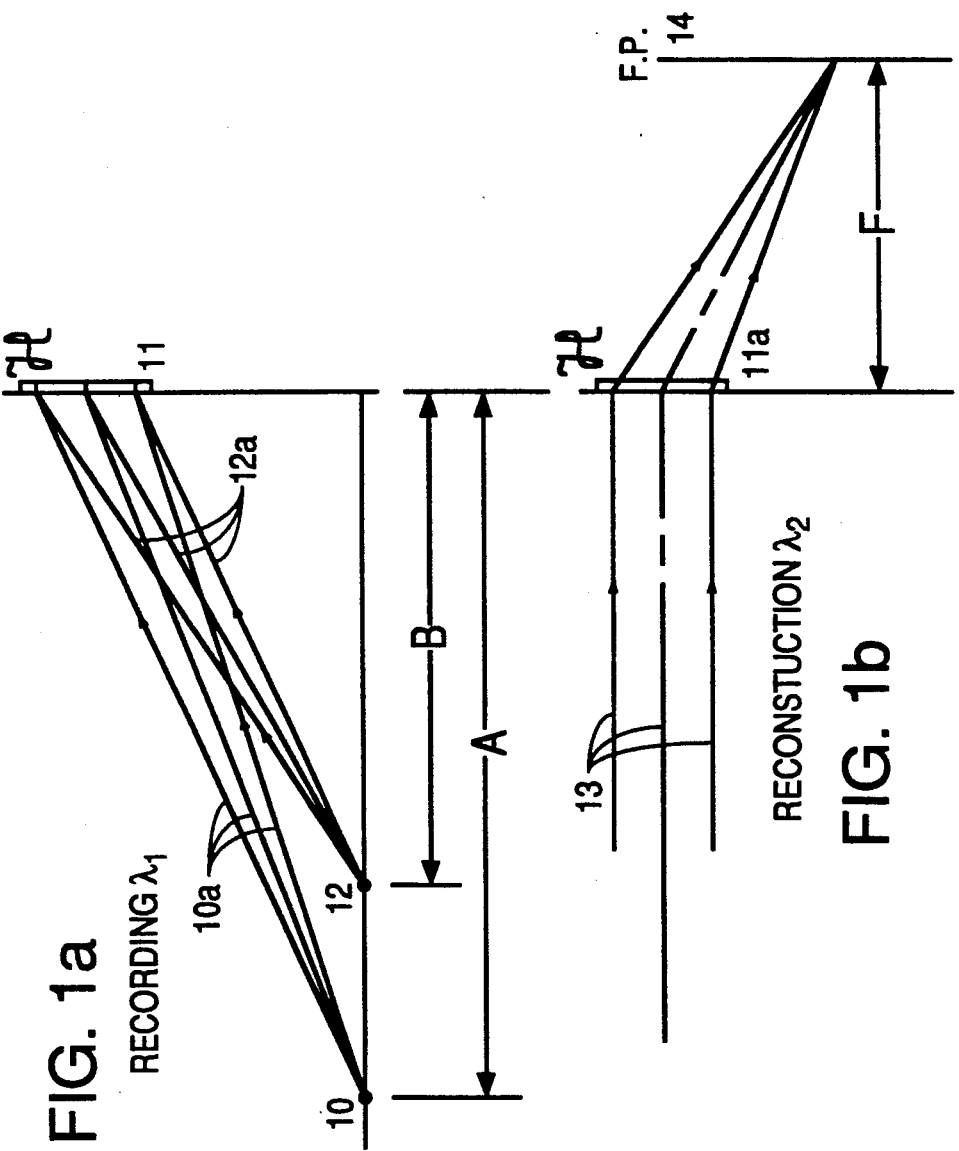

FINITE S

S=0

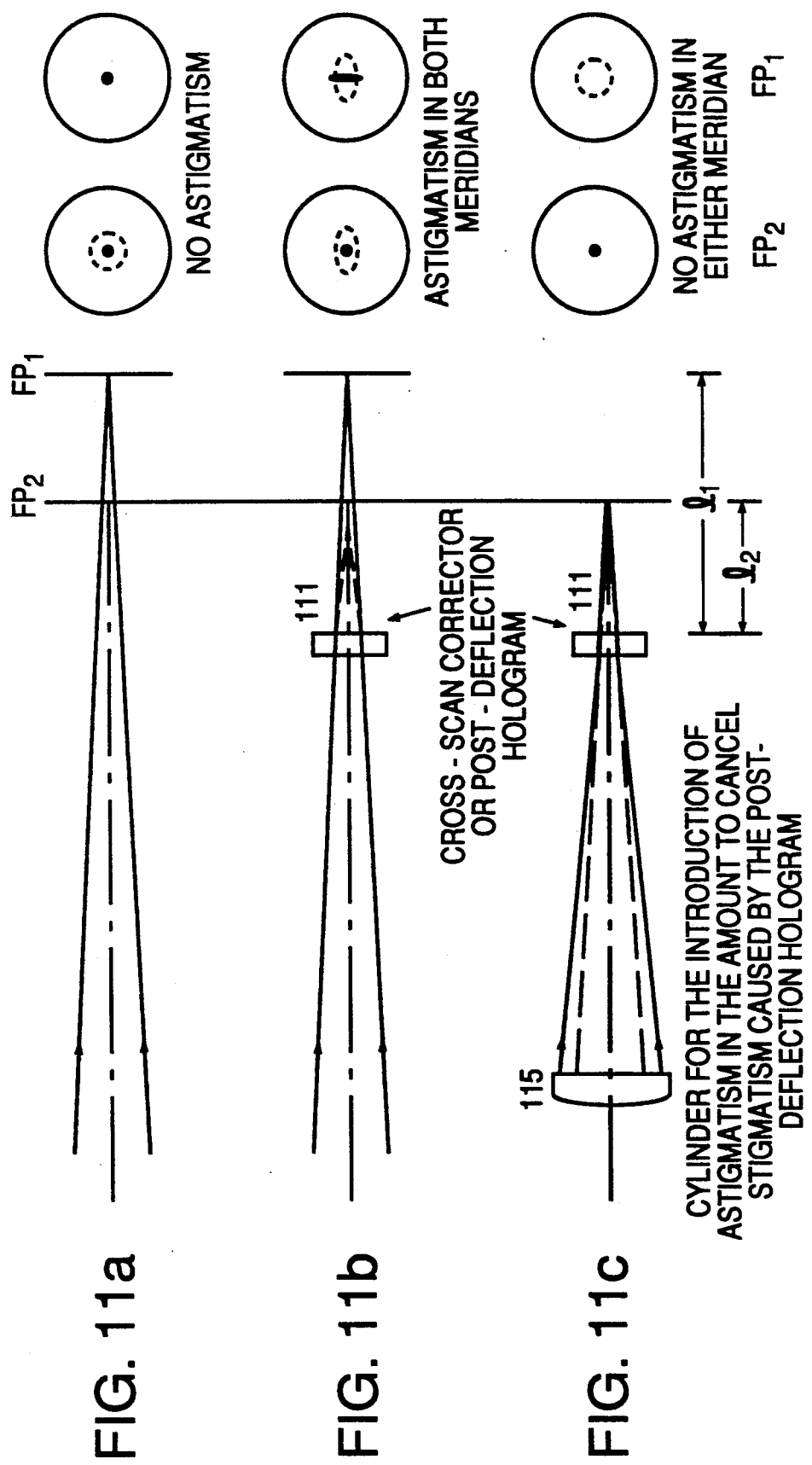

SPECIFICATIONS OF A LASER SCANNING UNIT
FOR 300 DPI MODULE

| | |
|---|---|
| SCAN LINE LENGTH | 216 mm |
| RESOLUTION | |
|   DOT INTERVAL | 63.5 |
|   DOT DIAMETER | 75 x 90 |
| LASER CENTER WAVELENGTH | 780 |
| DUTY CYCLE | 0.7 |
| SCAN LINES / SEC | 39.7 |
| LINE TIME FOR 270 LENGTH | 2.54 ms |
| DOT TIME | 597.4ns |
| NUMBER OF HOLOGRAMS ON DISC | 6 |
| DISC SPEED | 39.37 |
| ANGULAR VELOCITY ACCURACY | 1 : 50,000 |

DEFLECTION ERRORS INCLUDING BOW LINEARITY
FOR 300 DPI MODULE

The X and Y coordinates of dot placement are given below. Both for ideal placement and actual placement. The line bow is determined by Y and the linearity is determined by X.

| HALF FIELD | Y | X CALCULATED | X MEASURED | DEFLECTION ERROR |
|---|---|---|---|---|
| 0 | 0.0 | 0.0 | 0.0 | 0.0 |
| 5 | 0.004mm | 35.983mm | 35.986mm | .003mm |
| 10 | 0.009mm | 71.966mm | 71.961mm | .005mm |
| 15 | 0.001mm | 107.95mm | 107.938mm | .012mm |
| 22 | | | | |

FIG. 16

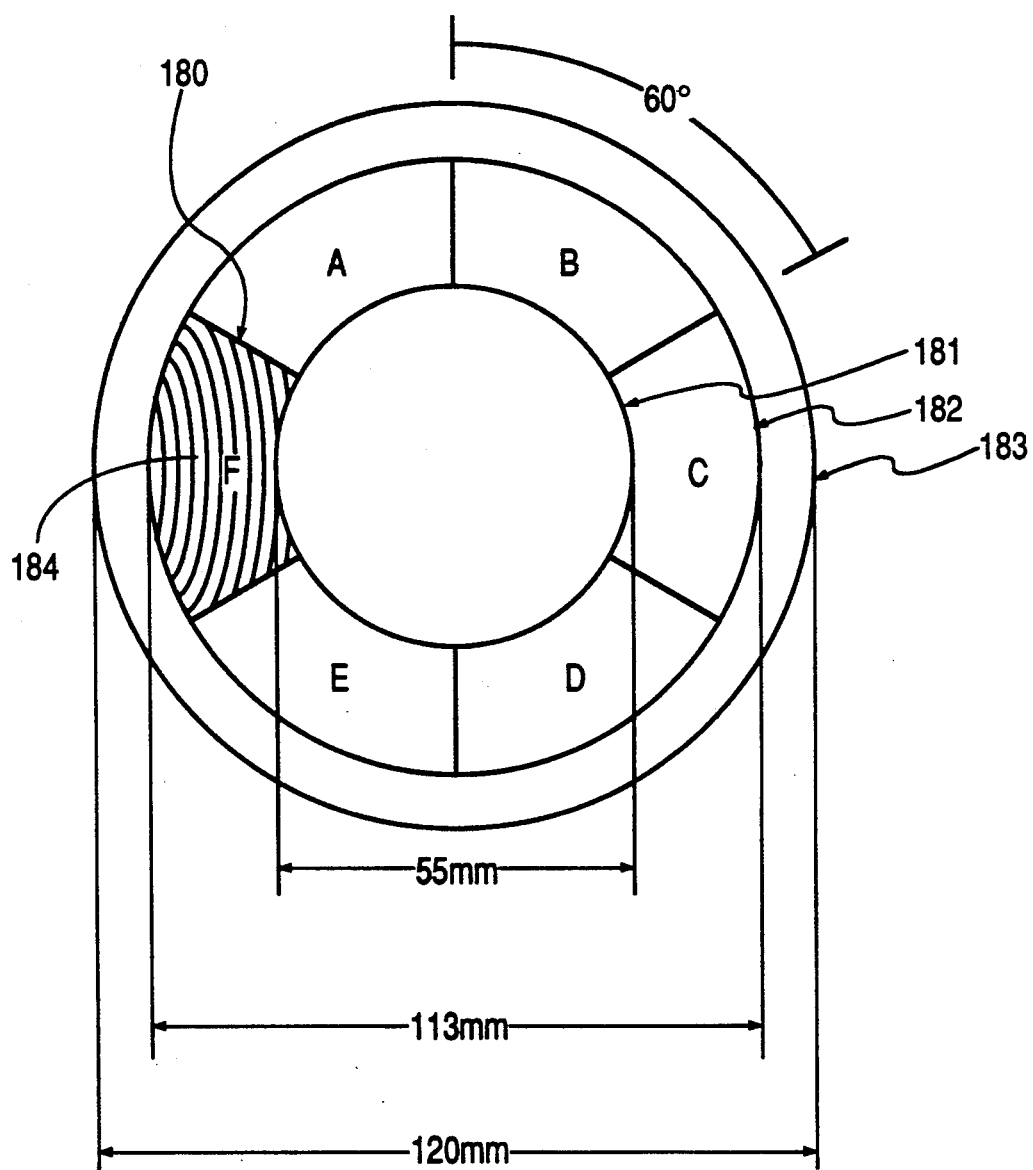

HOLOGRAPHIC RECORDING AND SCANNING SYSTEM AND METHOD

BACKGROUND OF THE INVENTION

1. Field of the Invention

This invention relates to holographic recording and scanner systems and specifically to a holographic scanner which is both less expensive and at least as accurate as prior art holographic scanning systems.

2. Description of the Prior Art

U.S. Pat. No. 4,753,503 discloses a laser scanning system utilizing a laser beam conditioned to provide proper beam shape prior to the passage of the beam through a diffraction grating on a rotating holographic disc. Mirrors and similar optics allow the laser beam to be scanned along a straight line on a rotating drum for the recording of information. The system of the '503 patent uses a solid-state laser diode 11 together with collecting lens 12 to collect and collimate the output light from diode 11. The processed laser beam is then deflected by a holographic scanner consisting of a rotating disc with a plurality of diffraction gratings formed thereon to produce a rotating diffracted beam which is used to store information on a photoconductive surface. The system of the '503 patent uses optics to process the beam produced by the laser diode to ensure that the processed beam has the appropriate characteristics for use in generating a scan line on the photoconducting surface of the recording drum. The optics add cost to the scanning system.

Other laser scanning systems using holographic scanning discs and light beams for monochromatic light sources are disclosed, for example, in U.S. Pat. Nos. 3,721,486; 3,750,189; 3,951,509; and 4,094,576. In addition, papers such as the paper by Ih entitled "Holographic Laser Beam Scanners Utilizing an Auxiliary Reflector," published on page 2137 of the August, 1977 issue of Applied Optics (Vol. 16, No. 8) and by Pole et al. entitled "Holographic Light Deflection" on page 3294 of Applied Optics, Oct. 15, 1978, Vol. 17, No. 20 relate to holographic scanning systems utilizing monochromatic light sources.

Many of the holographic scanning systems of the prior art produce a scan line which varies in position as a function of variations in the frequency of the monochromatic light and in the angle of incidence of the scanning beam on the holographic disc due to wobble of the disc. In addition, in some cases the monochromatic light source is not truly monochromatic causing additional uncertainty in the location of the scan line.

SUMMARY OF THE INVENTION

In accordance with this invention, a holographic and recording scanning system is provided which overcomes certain of the disadvantages of the prior art. The holographic scanning system of this invention eliminates certain optical components previously required in prior art scanners thereby significantly reducing the cost of the system. In addition, the holographic scanning system of this invention is substantially less sensitive to disc wobble and variation in the frequency of the monochromatic light source than are prior art systems.

This invention provides a structure which makes use of a recording geometry in which no significant Seidel induced aberrations arise. The recording geometry comprises a first point source monochromatic object beam and a second point source coherent with the object beam source. The object and reference beams interfere to produce a pattern recorded on a photosensitive surface, thereby creating the pattern from which the hologram on the scanning disc is created. Reconstruction of the object is made by exposing the scanning disc to substantially monochromatic light from a point source generated by any commercially available laser diode at the same or different frequency. This enables reconstruction at a different wavelength, i.e., in the range of 700–1000 nm which is typical of low-cost laser diodes, than what is used for recording the hologram. One or two hologram surfaces can be used in this reconstruction. The hologram on the scanning disc not only directs the reconstruction beam, but also focuses it. Further, the reconstruction beam is at a large enough angle to the scanning disc to insure all diffracted light goes into one first order.

In accordance with this invention, a curved mirror, which creates nearly equal optical path length increments for each equal angular increment of rotation of the scanning disc, can be used. This mirror corrects for bow or curvature of the scan line, and ensures linearity. The curved mirror also optimizes flatness of the focal plane. Disc wobble is minimized by insuring that the incident angle of the reconstruction beam to the scanning disc is equivalent to the diffraction angle.

This invention provides a structure for achromatization, or correction of beam placement because of mode hops or drift in laser frequency. This structure corrects for both in-scan change, (i.e., the change in the focal point along the line of scan), and cross-scan change, (i.e., the change in the focal point perpendicular to the line of scan).

In-scan correction of beam position as a function of change in beam wavelength can be done by two methods. In one method, a pre-scan hologram can be used so that its spatial frequency provides an angular dispersion of the amount required to move the beam to the correct position on the scanning disc. A second method uses a prism as a dispersive element to move the system aperture (i.e., the spot of light incident on the scanning disc) along the scanning disc radius with subsequent wavelength changes to achieve in-scan correction.

Cross-scan correction is accomplished with a post-scan hologram (i.e., a hologram placed in the optical path after the scanning disc). This correction comprises placing a hologram near the focal plane which creates a stigmatic beam, i.g., a beam that is unable to form approximately point images. Three methods are disclosed to correct the stigmatism.

In the first method, an optical element with an astigmatism is placed near the scanning disc to substantially cancel the stigmatism created by the post-scan hologram. The second method comprises using a radially symmetric laser collimator which emits an astigmatic beam. Once again, the astigmatic beam corrects for the stigmatism produced by the post-scan hologram. The third method involves the adjustment of the degree of astigmatism specified for in the collimator lens, together with the degree of natural astigmatism in a typical laser diode, in order to substantially cancel the stigmatism created by the post-scan hologram.

In another embodiment of the present invention, the pre-scan hologram is removed and the post-scan hologram is moved closer to the focal plane. In this embodiment, the stigmatism created by the post-scan hologram is corrected by an optical element placed before the post-scan hologram which serves the same function as the pre-scan hologram. The position of the system aperture is adjusted with an aperture mask to control the shape of the beam cross-section.

Recording of the post-scan hologram is ac achieved with a plurality of lenses which possess different collimating properties in the vertical and horizontal planes.

Further, in accordance with this invention, a method is provided in which a scanning disc may be replicated on various transparent materials.

Hence, this invention provides a structure which allows for a commercially viable holographic optical system. This system offers significant cost savings over other systems because of its use of inexpensive laser diodes and the replacement of expensive optical lenses which are generally used in a conventional system with holographic surfaces which focus and correct the beam.

This invention will be more fully understood in light of the following detailed description taken together with the drawings.

DESCRIPTION OF THE DRAWINGS

FIGS. 1a and 1b illustrate a prior art method of recording a hologram wherein reconstruction is made by exposing the recorded hologram to a collimated light source at normal incidence.

FIG. 11a shows a light beam being focused onto a focal plane without a cross-scan corrector or an optical element.

FIG. 11b shows the effect of the cross-scan corrector on the light beam.

FIG. 11c shows the effect of an optical element with the cross-scan corrector which changes the focal plane.

FIG. 12a comprises a configuration for recording the post-scan hologram, i.e., cross-scan corrector.

FIG. 12b shows a side view of the reference path of FIG. 12a.

FIG. 13 illustrates a side view of the object path of FIG. 12a.

FIG. 16 illustrates the specifications and deflection errors including bow and linearity for a 300 DPI (i.e., dots per inch) module of the type shown in FIGS. 15 and 16.

FIG. 17 shows an actual embodiment of the scanning disc with six facets.

DETAILED DESCRIPTION OF THE INVENTION

Figure 2A:
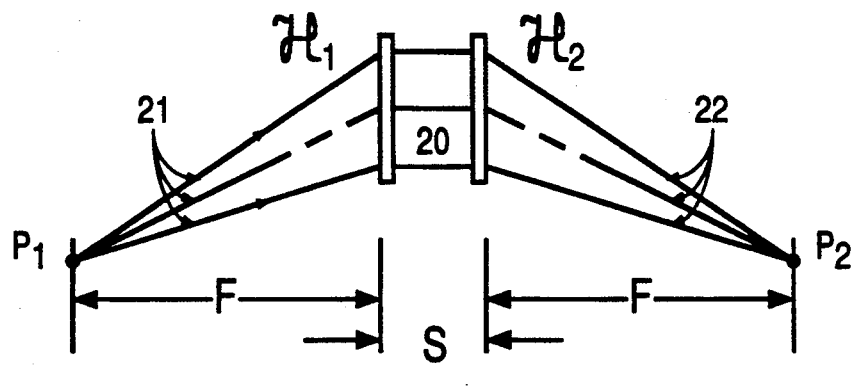
FIGS. 2a and 2b show two embodiments of the present invention which use a spherical wave of light originating from a point source as a reconstruction beam.

The prior art makes use of a pre-scan hologram which produces a wave-front aberration of approximately the same shape but of opposite curvature as the aberration function of the holograms on the scanning disc. The object is to cancel the Seidel induced aberrations which include: spherical aberrations, blurring of the image when parallel light is incident on a spherical mirror; coma, a comet-like appearance of an image of an object point located just off the lens axis; and astigmatism, a difference in focal length for rays coming in different planes from an off-axis object. Seidel aberrations are discussed in more detail by F. Jenkins and H. White in *Fundamentals of Optics.* 151-171 (1976).

However, it is very difficult to get perfect cancellation. Therefore, some residual uncanceled aberration remains, the amount of which depends on the attainment of perfect alignment of X, Y, Z, and rotation about each respective axis and of the exact wavefront shape in the pre-scan hologram itself.

One means for aberration correction is a system which makes use of a recording geometry in which no significant aberration arises. This system avoids the cost associated with precise aberrated wave front alignment and curvature matching. A principle used in this system for recording wavelength $\lambda_1$, (for example 441.6 nm) and readout at $\lambda_2$ (780 nm) without aberrations is described by Clay in the *Handbook of Optical Holography,* 441–444 (1979). The recording parameters are calculated from considerations of the desired readout geometry and wavelength shift between recording and readout.

In FIG. 1a, the recording geometry comprises a first point source 12 of monochromatic light as the object beam 12a and a second point source 10 of monochromatic light as the reference beam 10a in which the first and second points lie on a straight line perpendicular to the hologram plane 11. One embodiment of this invention uses a photo sensitive surface comprised of Shipley Microposit 1400–37. Other comparable photoresists can also be used. The object beam 12a and reference beam 10a create interference fringes, i.e., regions of alternating bright and dark intensity, that are recorded on a layer of photosensitive material the surface of which is the hologram plane 11. After the exposure, the photosensitive surface is developed using conventional development processes to produce thick and thin regions of photosensitive material forming a diffraction grating. Hence, the amount of photosensitive material left at any location is a function of the exposure. As seen in FIG. 1b, this hologram on scanning disc 11a is illuminated by a collimated monochromatic light beam 13 at normal incidence to the disc in order to reconstruct the object.

A detailed analysis shows that if a holographic optical element of focal length F on focal plane 14 is desired at $\lambda_2$ and if $\lambda_2 = \alpha\lambda_1$, then the distances A and B in the recording geometry of FIG. 1a are determined by the simultaneous solution of the two equations:

$$\frac{1}{A} - \frac{1}{B} = \frac{1}{\alpha F}$$

$$\frac{1}{A^3} - \frac{1}{B^3} = \frac{1}{\alpha F^3}$$

where

A is the perpendicular distance between the reference point source 10 and the hologram plane 11 and B is the distance from a point object 12 to the hologram plane 11.

Holograms as recorded above have yielded reconstructed images free from chromatically induced Seidel aberrations over a frequency shift of more than an octave. (Diffraction limits the operation for an object consisting of an array of 11×11 dots covering a detector array of 11×11 elements with overall dimension of 6.5×6.5 mm. Clay, supra, at 443. However, only one dot is reconstructed here.)

However, when the hologram 11a is read out by placing the input beam 13 at normal incidence, maximum theoretical diffraction efficiency (i.e., intensity of diffracted light beam into any particular order divided by the intensity of the input light beam) for the plus and minus first orders is about 32%, and the zero order yields 32%. For output angles $\Psi$ from about 20 to 45 degrees this is not a desirable efficiency. Therefore, there is a need for a configuration in which nearly all the diffracted light goes into one first order to achieve about 90% diffraction efficiency.

Figure 2B:
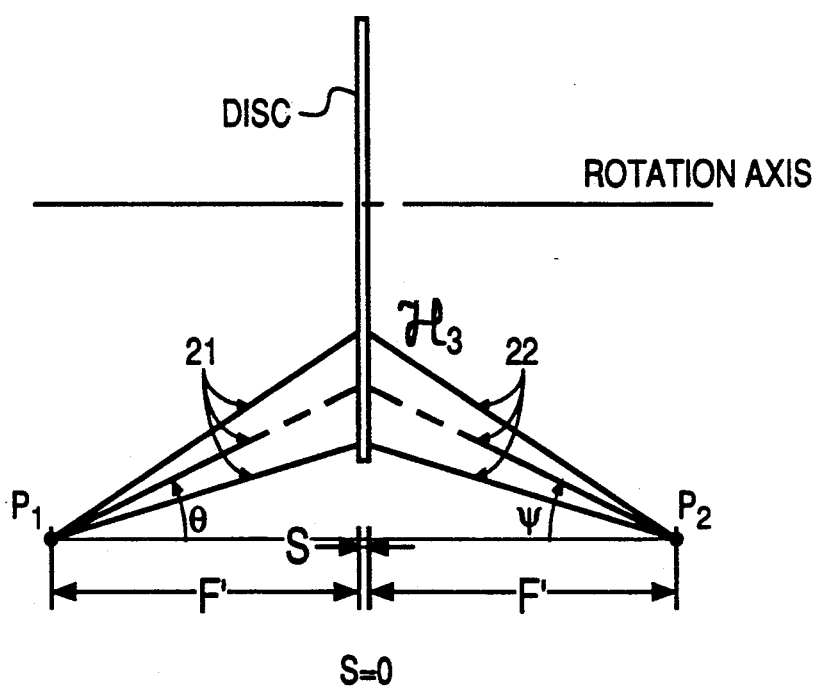

In accordance with the present invention, FIGS. 2a and 2b show that the readout beam is no longer a collimated beam. Instead, there is a spherical wave 21 originating from $p_1$ such that $p_1$ and $p_2$ are at equal conjugates, i.e., $p_1$ and $p_2$ are at equal distance from the holographic plane(s).

In FIG. 2a, the recording medium is placed on both sides of the substrate 20 whereby identical holograms $\mathcal{H}_1$ and $\mathcal{H}_2$ are recorded on both sides. At readout, the beam is collimated in the space between the two hologram surfaces, i.e., within the substrate 20.

However, using only one hologram surface is more desirable. With only one hologram $\mathcal{H}_3$, the focal length F' must then be one-half of that shown in FIG. 1b and the principle incidence angle $\theta$ must be equal to the principle diffracted angle $\psi$. This means that the average fringe frequency is doubled and the quadrature terms are appropriately scaled. FIG. 2b shows a layout conforming to this requirement.

A higher diffraction efficiency is now achieved since the input beam 21 is not at normal incidence, but at an angle large enough to ensure that essentially all of the light is diffracted into one first order. Two conditions must be met to ensure this effect:

1) The input beam 21 and output beam 22 must be comprised of angles falling between 20 and 60 degrees and
2) the h/d ratio must be approximately 0.36 for reflection holograms and about 1.44 for transmission holograms assuming n=1.6, where n is the refractive index for polycarbonate (Hence, n would vary depending on the material used.)

h is the groove height as defined below, and d is the grating constant also defined below.

In accordance with this invention a transmission grating is used. A transmission grating is a diffraction grating with many fringes in it. The depth of the fringes is the groove height. The distance between midpoints of two grooves is the grating constant.

Figure 3:
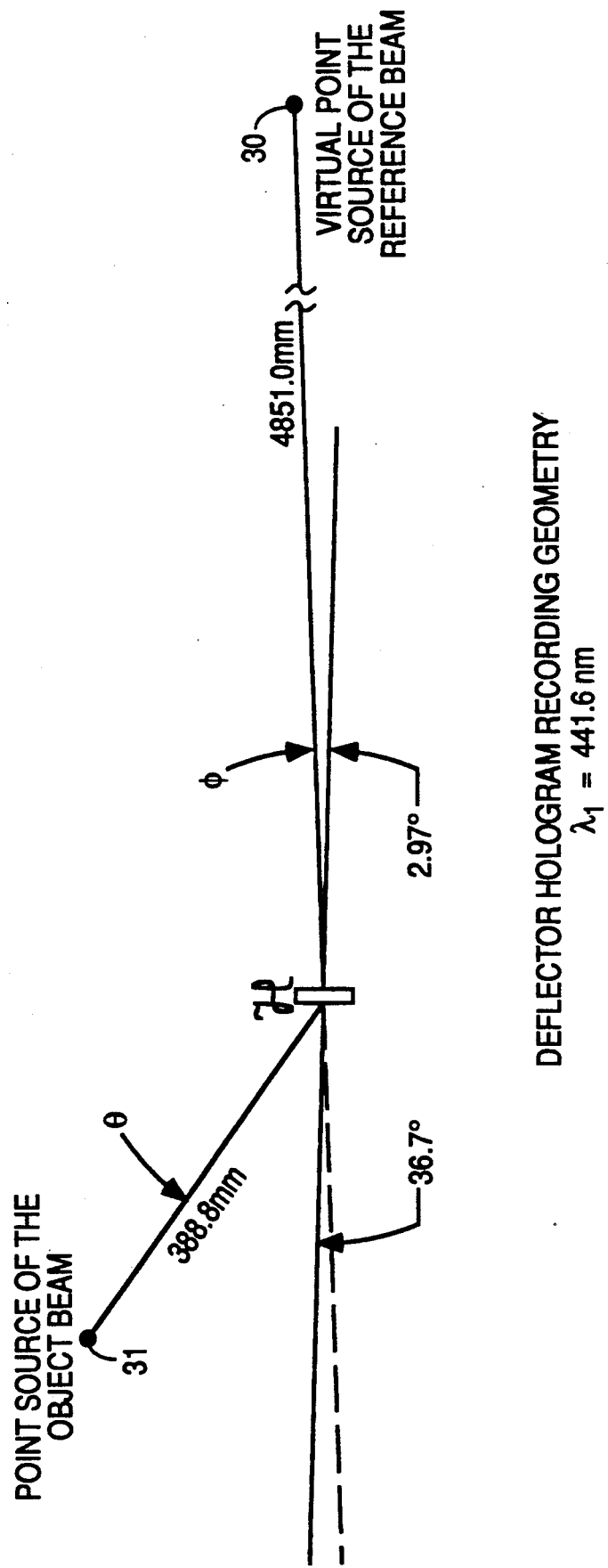
FIG. 3 illustrates one example of the recording geometry that would allow reconstruction of the object with a point source of light and a coherent virtual point source.

The recording geometry would then be derived from the foregoing by holographic coordinate transformation, resulting in the layout of FIG. 3 which illustrates the relative locations of the monochromatic beams and the holographic surface for recording the scanning disc $\mathcal{H}$. FIG. 3 further illustrates that it is unnecessary for the point source 31 of the object beam and the point source 30 of the reference beam to be located in a straight line perpendicular to the hologram plane $\mathcal{H}$.

Figure 4A:
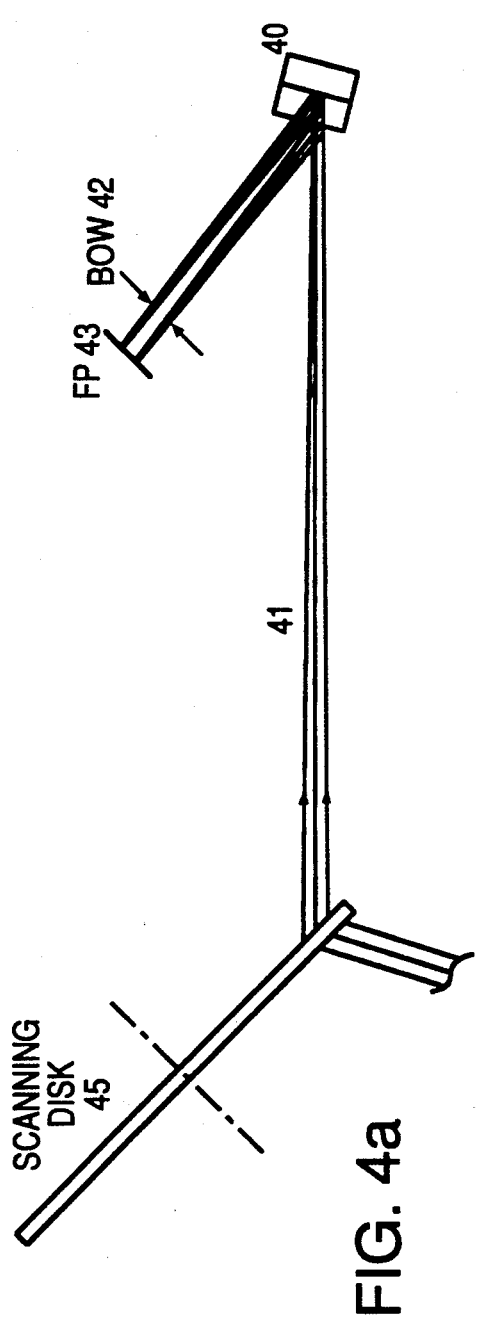
FIG. 4a shows a bow in the reconstruction beam which is produced by deflector hologram recording geometry.
Figure 4B:
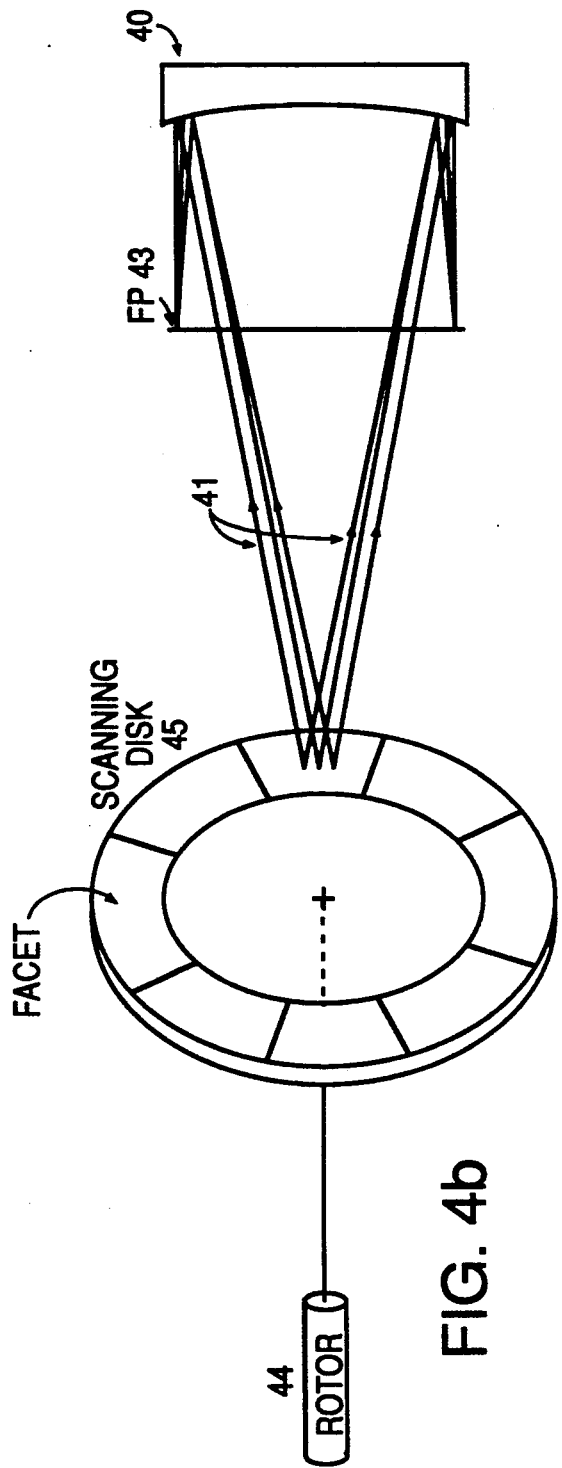
FIG. 4b illustrates the inclusion of a curved mirror to correct for bow in the scan line.

However, at readout, this arrangement would produce a scan line that is not wholly free from bow. Therefore, a curved mirror 40 is added as shown in FIGS. 4a and 4b. The curved mirror 40, in one implementation, is a cylindrical curved mirror which has no power in the cross-scan direction. Hence, other system components would have to be adjusted to provide the necessary power in the cross-scan direction. The preferred embodiment comprises a two dimensional curved oblate spheroid mirror. This mirror's curvature is determined by solving for the vertex curvature C in the equation below.

$$Z_{sag} = \frac{CY^2}{1 + \sqrt{1 - (K + 1)C^2Y^2}}$$

where K is the conic constant, Y is the zone height, i.e., radius on the lens at which light strikes it, and $Z_{sag}$ is the mirror's sagitta of arc. See FIGS. 5a and 5b. Its position and curvature make the system approximately telecentric, i.e., when the axis of the scan beam is everywhere normal to the focal plane. The scan line curvature is affected by the angular incidence of the beam 41 on the mirror 40, which allows adjustment of the bow 42 at the focal plane 43 without significantly affecting the system's telecentricity. This adjustment yields a very straight line for a line length of 216 mm (8.5 in) as the bow is only 4 micrometers (four parts in 216,000 or 0.00185%).

Figure 4C:
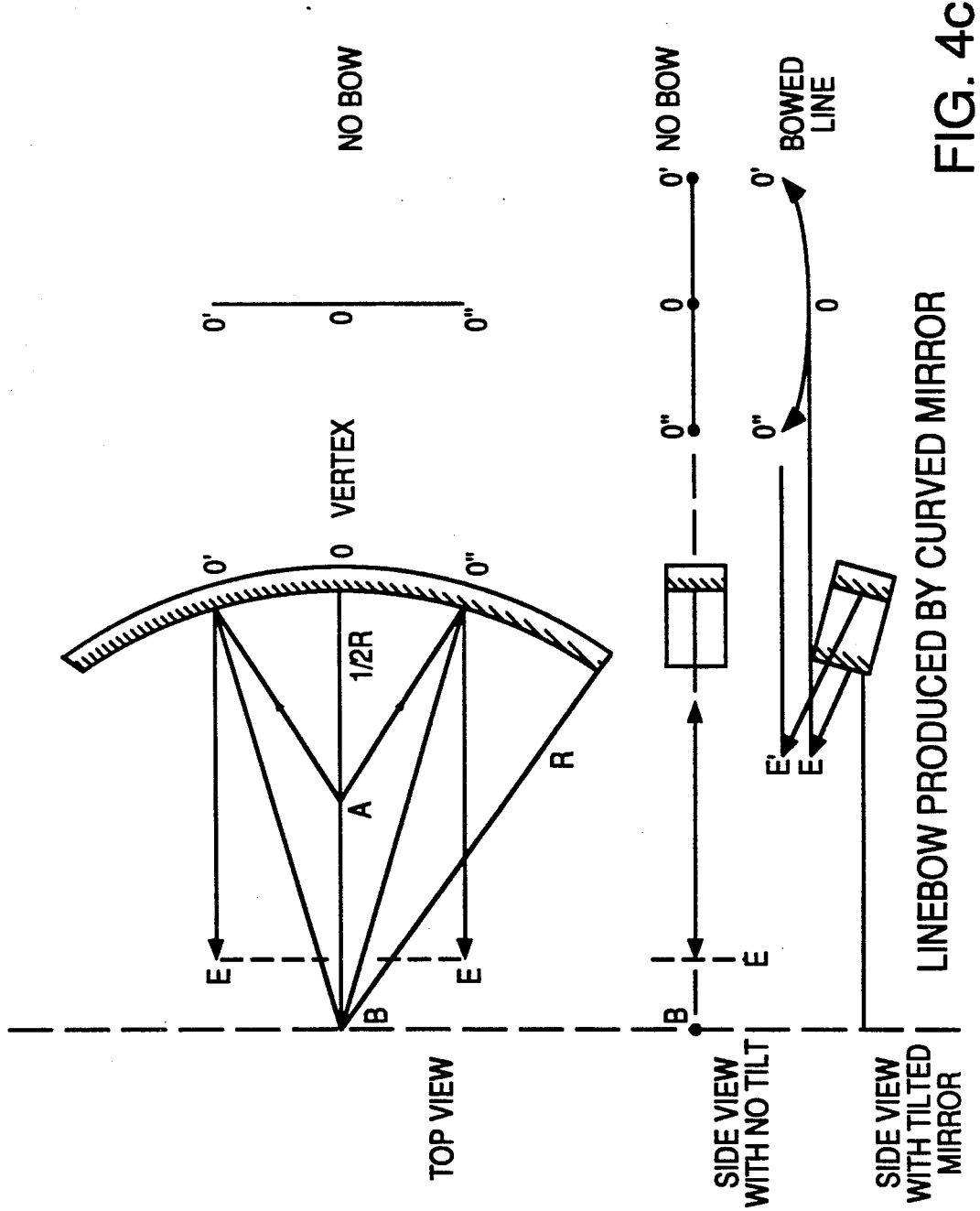
FIG. 4c illustrates a detailed geometry used to eliminate bow.

Referring to FIG. 4c, consider the following example. A plane triangular fan of light A-O''-O' is place with its apex on a normal to the center of the mirror 40 and at a distance of one half a radius R from the mirror vertex, or point of greatest curvature on the mirror. (Note: point A is located on the scanning disc which is not shown in FIG. 4b. Point A also indicates where the apex of the fan of light is placed.) That fan of light will be reflected as a parallel-sided plane sheet of light having the width of the intercept distance EE', i.e., the mirror of radius R collimates the fan of light where the fan is the envelope of the scanned beam and the deflection center is at A. This will occur at normal incidence. However, if the fan of light is incident at an angle other than zero, the reflected sheet of light will no longer lie in a plane but will acquire a bow. The depth of bow (sagitta of arc, or distance from the mid-point of an arc to the mid-point of its cord) is a function of the angle of incidence and of the radius of the mirror. The direction of the bow will depend on the direction of incidence.

If the input fan of light is bowed, then at some angle of incidence other than zero the reflected sheet of light can be made plane by adjusting the mirror angle.

As FIGS. 4b and 4c show, the curved mirror 40 (which is approximately spherical), can be angularly adjusted to bring about a change in incidence, resulting in a correction of the bowed line. If the curvature of the mirror is made less, then the incidence deviation must increase to accommodate the correction. However, for the spot of light to travel in equal length intervals on the focal plane for equal time intervals, a specific curvature, as described more fully below, is disclosed.

Figure 5A:
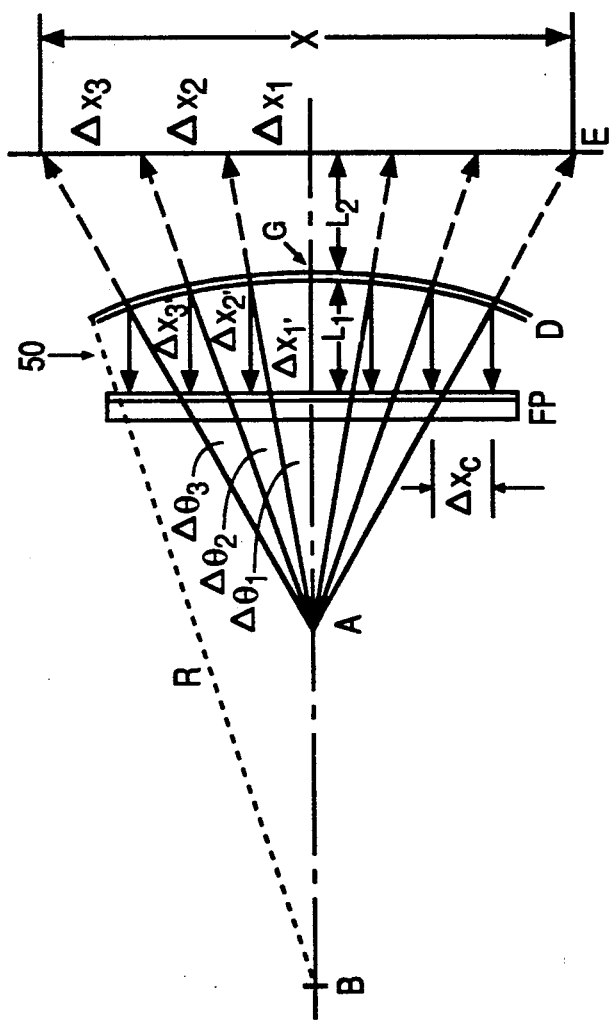
FIG. 5a illustrates a structure for obtaining bow correction, linearity, and a flat field.

In FIG. 4b, the rotor 44 which is connected to scanning disc 45 travels at a constant angular velocity and, therefore, scanning disc 45 deflects the beam 41 in equal increments with time. However, reference to FIG. 5a shows that the line is scanned in unequal length increments with time starting with $\Delta\theta_1$ where $\Delta X_1$ is the length of the line segment. $\Delta X_2$, generated by $\Delta\theta_2$, is slightly longer, etc. It logically follows that $\Delta X_n = A\text{-}E\tan\theta_\eta$ where AE is the distance from the deflection center A to the focal plane E.

Figure 5B:
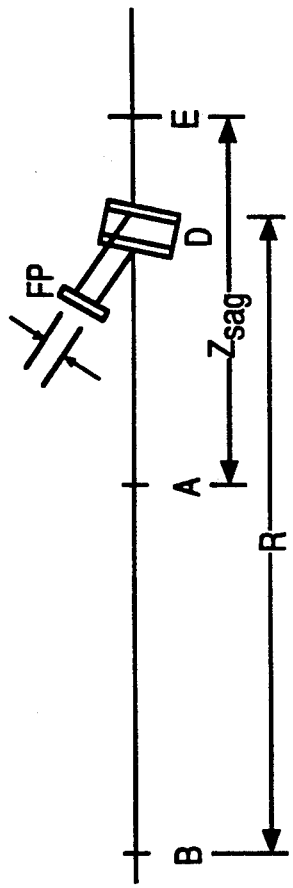
FIG. 5b illustrates the structure and equation to obtain maximum bow correction.

The desired effect would be $\Delta X = k\theta$, where k is a constant. The goal of a f-$\theta$ lens is to perform in this way, but the effect is imperfect. A significant difference between the design of general purpose objective lenses and f-$\theta$ lenses is that the designer adds a component of negative distortion to the f-$\theta$ lens in order to linearize the scan line such that $x = f \tan \theta$, where x is the distance along the scan line, f is the focal length, and $\theta$ is the field angle. However, the distortion curve produced by the f-$\theta$ lens does not quite fit the required error curve for the system. Specifically, the f-$\theta$ lens can change the amplitude, but cannot exactly match the shape of the curve. A spherical mirror segment D, as shown in FIGS. 5a and 5b, more accurately creates the desired curve. Additionally, the spherical mirror D is much cheaper than an f-$\theta$ lens.

If the radius of the sphere has its center placed on axis at point B and line segment AG=2R, where R is the mirror radius so that the mirror focus is coincident with the center of rotation of the scanning disc (not shown), then the reflected rays 50 will intersect the focal plane FP so as to make nearly equal optical path length increments (i.e., $\Delta X_1$, $\Delta X_2$, etc.) for each equal angular increment (i.e., $\Delta\theta_1$, $\Delta\theta_2$, etc.). This correction is valid for small fields-of-view. For more complete correction and wider field angles, an aspheric surface is used.

Maximum bow correction is achieved by the configuration and equation illustrated in FIG. 5b. For the implementation shown in FIG. 5b, the curve of the mirror D is defined by using a conic constant of 2.65. Thus, a departure from linearity of 0.005% is obtained. A further benefit of using this mirror is that the system's focal plane FP is much flatter than that obtained with competitive methods.

The actual surface to be written on, or focal plane FP, is a straight line element on a drum or in some cases a photoreceptor having a planar surface. In any case, the curved mirror D eliminates the problem of the f-$\theta$ lens which tends to enlarge the focused spot near the edge of the field. Thus, the curved mirror corrects bow and linearity while producing a flat field.

In one embodiment of this invention, the scanning disc is positioned at the angle of minimum deviation to eliminate dot position errors caused by the wobble of the rotating disc. This necessitates that the incident angle $\theta$ equals the diffraction angle $\Psi$. The wobble angle $\beta$ at any instant changes the input to $\theta \pm \beta$ and the output to that shown as plotted in FIG. 6.

Then, $\sin(\theta \pm \beta) + \sin(\Psi \pm \beta) = \lambda v$, where v is the spatial frequency of the hologram.

Figure 6:
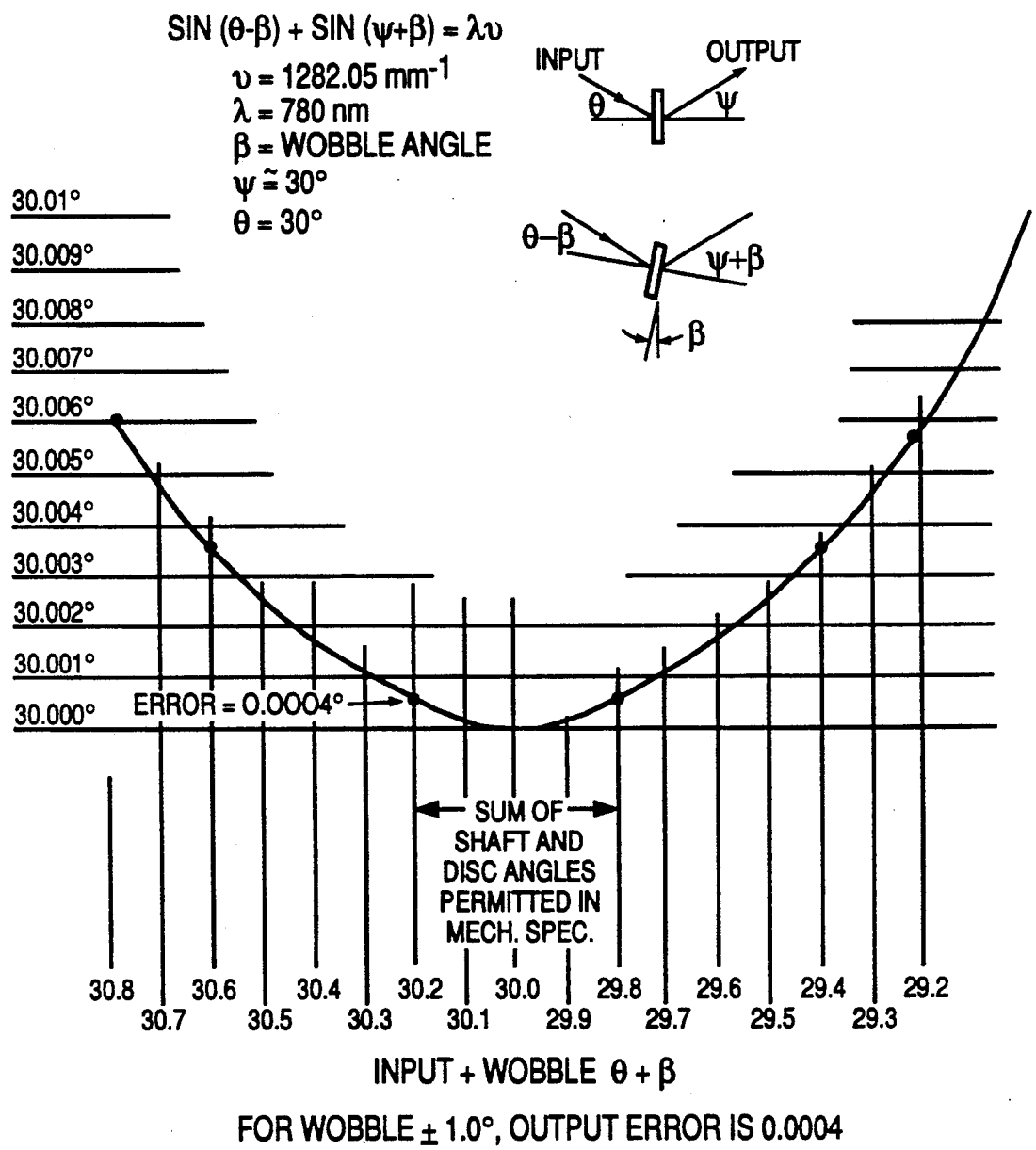
FIG. 6 shows a plot of diffraction angles for a range of wobble angles.

FIG. 6 shows that for a specified shaft wobble of 1.0 degree, the output angle shifts by 0.0004 degrees for a mean deflection of 30 degrees. The dot position error on a scan line then varies 4 microns for a system having a focal length of 480 mm. The spatial frequency used in this example is 1282.05 cycles per millimeter.

Diffraction gratings have a wavelength dispersion which is directly proportional to their spatial frequency (i.e., 1/d where d is the distance between fringes). Therefore, a hologram used to deflect a beam a specified amount for a given input wavelength will do so only at that wavelength. A change in wavelength will cause a change in deflection resulting in a beam position error.

Figure 7A:
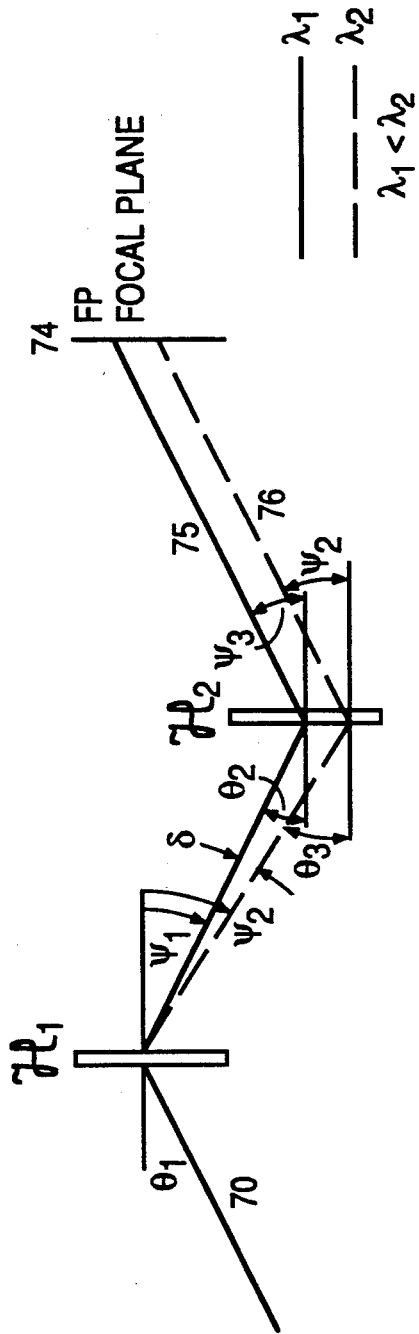
FIG. 7a shows a light ray diffracted by two holograms of the same spatial frequency in series.

FIG. 7a shows a ray 70 diffracted by two holograms in series $\mathcal{H}_1$ and $\mathcal{H}_2$ of the same spatial frequency. The solid line represents the path for $\lambda_1$. If the wavelength is increased to $\lambda_2$ where $\lambda_2 = \lambda_1 \pm \Delta\lambda$, then the diffraction angle is increased from $\Psi_1$ to $\Psi_2$ and the broken line represents the path taken by $\lambda_2$. Also, $\Psi_1 = \theta_1 + \delta$ and $\Psi_2 = \theta_3$. Because $\theta_2 = \Psi_3$, it logically follows that $\Psi_3 = \Psi_2$ upon diffraction by $\mathcal{H}_2$. Hence, a longer wavelength $\lambda_2$ will be diffracted at a larger angle $\Psi_2$, resulting in parallel rays 75, 76 hitting focal plane 74. Therefore, if $\mathcal{H}_1$ and $\mathcal{H}_2$ are equally dispersive, the two rays will emerge at the same angle but slightly displaced.

Figure 7B:
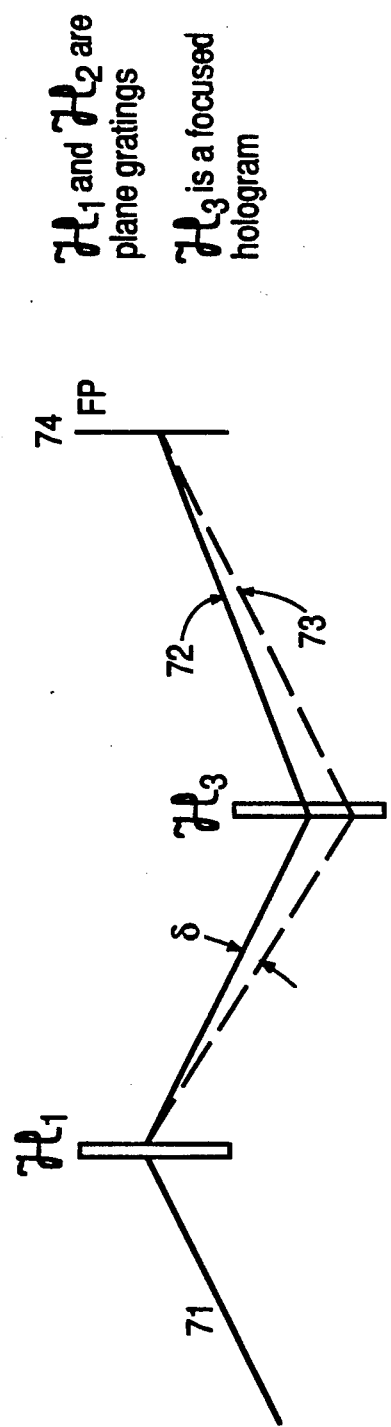
FIG. 7b shows a light ray diffracted by two holograms where the second hologram focuses the light in order to reduce cross-scan chromatic error.

If $\mathcal{H}_3$ is a hologram facet which focuses a light ray 71, as in FIG. 7b, then the displaced rays 72 and 73 converge at the system focal plane 74. Hence, an additional hologram or diffraction grating in series with the scanning disc will cancel chromatic errors—but only in one meridian, i.e., that which contains the plane of incidence. Therefore, only cross-scan chromatic error reduction is achieved.

Figure 8A:
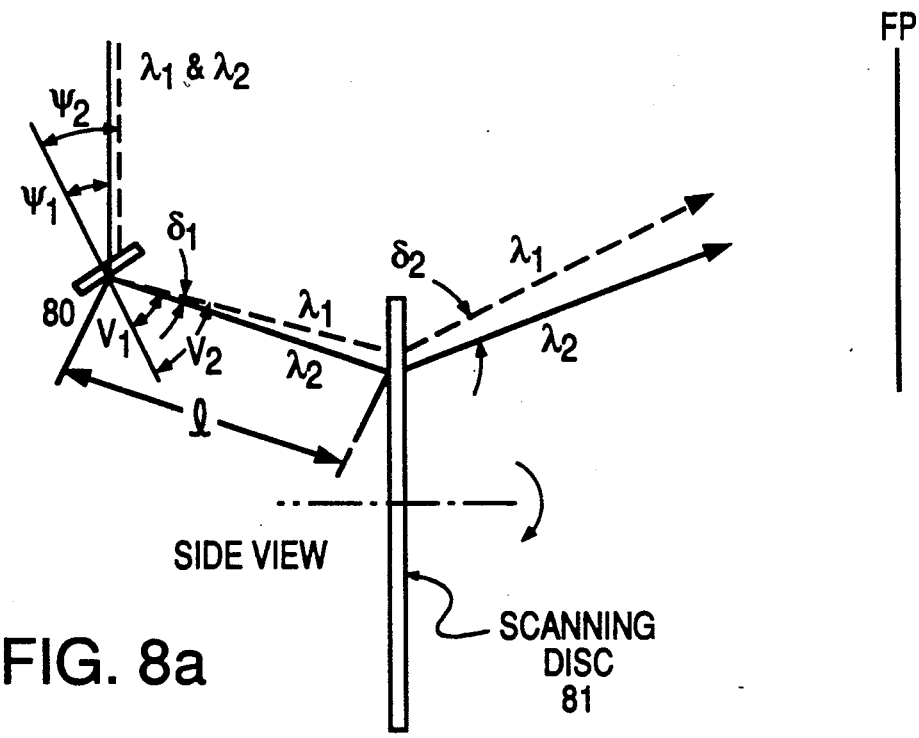
FIG. 8a illustrates irregular scan lines which produce in-scan dot placement errors.
Figure 8D:
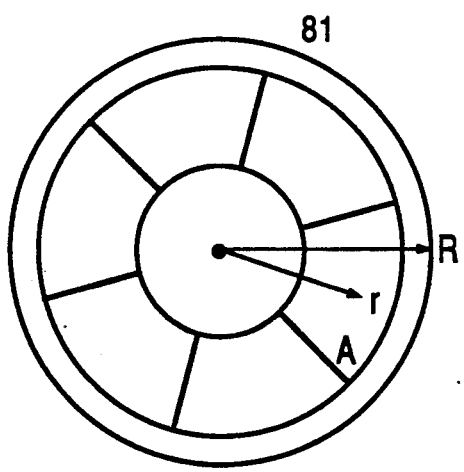
FIG. 8d shows a plan view of the facets on the scanning disc.
Figure 8B:
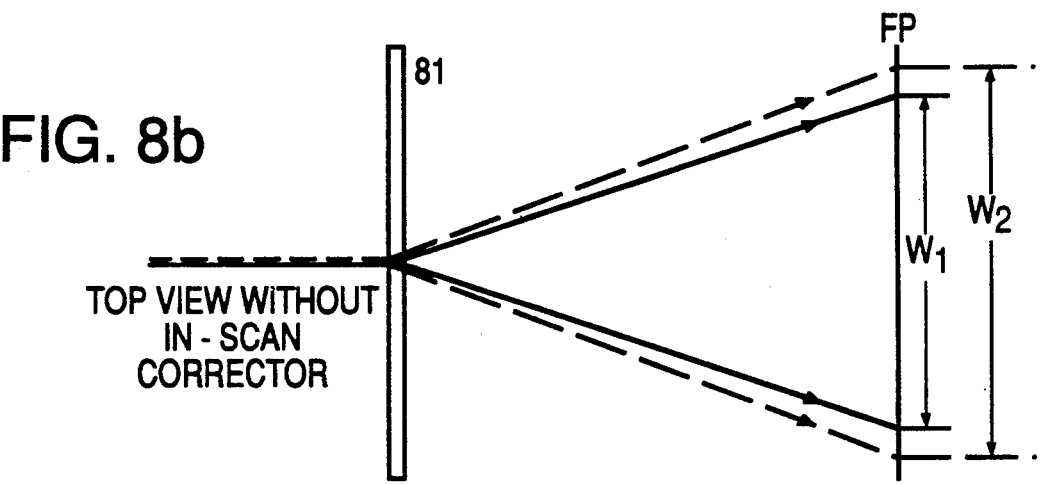
FIG. 8b shows a top view of a portion of the scanner system without an in-scan corrector.
Figure 8C:
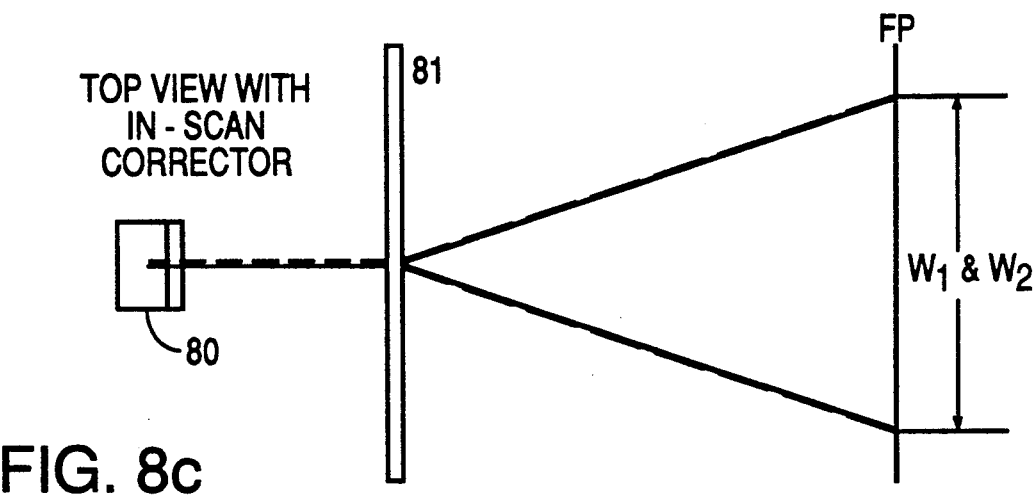
FIG. 8c shows a top view of a portion of the scanner system with an in-scan corrector.

Focal plane dot position errors are not confined to the cross-scan direction. For example, FIGS. 8a and 8b show that the length of a scan line $W_2$ will be greater for $\lambda_2$ than for $\lambda_1$ with scan line $W_1$, where $\lambda_2 > \lambda_1$. Hence, a separate means must be found to correct for in-scan dot placement errors.

Present state of the art in cross-scan correction is disclosed in European patent document EP0214018A2 in which a pre-scan hologram is used, but which contains a distortion in the fringe structure introduced to cause aberrations in the wave front incident on the deflector hologram. The deflector hologram is not designed to be free of wavelength-shift aberrations. Therefore, it must use other means of reducing spherical aberration and coma. This pre-deflector hologram distorts the wavefront by an equal and opposite amount to that caused by the deflector, thus achieving Seidel correction and a limited correction of readout chromatic errors in the cross-scan direction only. If the fringe field has no distortion, the pre-scan hologram could provide correction for in-scan errors. But since the fringe field is generally distorted, the ability to correct for in-scan errors is compromised. Precise alignment to the deflector in x, y, z and ϑ (rotation of a hologram about its normal axis) is required to obtain a null.

According to the present invention, FIG. 8a shows a pre-scan hologram 80 (hereinafter the in-scan corrector), which is a plane, constant frequency linear grating, oriented to increase rather than decrease the dispersion angle difference. Increasing the dispersion angle occurs when in-scan corrector 80 is not parallel to the scanning disc 81. This orientation will be discussed in more detail below. Hence, the in-scan corrector actually worsens cross-scan correction. This in-scan corrector 80 behaves in a way that takes advantage of the distortion of the scanning disc which creates greater magnification at the borders of the reconstructed object, i.e., pincushion distortion. Therefore, if the effective system aperture, i.e., the illuminated spot on the scanning disc which is produced by the light beam from the source being diffracted by the in-scan corrector, is moved toward the center of the scanning disc 81 by a changing wavelength, the angular change in incidence on the scanning disc 81 causes the length of the scan line to be minimized. Likewise, if the effective system aperture is moved toward the periphery of the in-scan corrector 80, the scan line is lengthened. However, this movement increases bow (bow is treated as a separate problem and is dealt with in preceding paragraphs).

As described above, the in-scan corrector 80 provides the means of positioning the system's aperture on the scanning disc 81. Therefore, the angle from the source 81, i.e., laser or collimator lens to the scanning disc varies as a function of wavelength. A longer wavelength, such as $\lambda_2$, causes the in-scan corrector 80 to diffract the beam through a greater angle and consequently toward the center of the scanning disc 81. FIGS. 8a, b, c show these effects. As seen in FIG. 8d, if the correction desired is to radius r along the radius R of the scanning disc on facet A, then $$r = l \tan \delta_1$$

where l is the distance from the in-scan corrector to the facet A on scanning disc 81. The following equation is well known in the art, $$\nu_1 = \frac{\sin \psi + \sin \upsilon}{\lambda}$$

where $\Psi$ is the angle of incidence, $\upsilon$ is the angle of diffraction, and $\nu_1$ is the spatial frequency of the hologram. Hence, the angle $\delta_1$ is obtained by applying the equations:

$$\sin \Psi_1 + \sin \upsilon_1 = \lambda_1 \nu_i$$

$$\sin \Psi_2 + \sin \upsilon_2 = \lambda_2 \nu_i$$

where $\lambda_2$ is the wavelength for which the correction is made and $\nu_i$ is the spatial frequency of the in-scan corrector. In this case, $\upsilon_2 - \upsilon_1 = \delta_1$.

Therefore, correction for in-scan error is achieved by providing an in-scan corrector having a spatial frequency yielding an angular dispersion of the amount required to move the beam to the correct position on the disc, thereby achieving a constant line-length. For example, if the in-scan corrector is 30 mm from the scanning disc, as seen in an actual embodiment of the present invention in FIG. 14, then the input and output angle is 31.5°, thereby creating a spatial frequency equal to 1339.7 cycles per millimeter.

Another embodiment makes use of a prism (not shown) as a dispersive element, rather than the in-scan corrector, to move the system aperture along the disc radius with subsequent wavelength change. However, the use of a prism is less accurate because the dispersion of a prism is a function of wavelength, and therefore, beam displacement is non-linear. For very small wavelength changes, the non-linearity of the prism correction would not be a problem.

A diffraction grating on an in-scan corrector, on the other hand, has a constant dispersion and the beam displacement is linear. Additionally, in-scan correctors cost less than prisms. Therefore, because of both flexibility and cost, most embodiments of the present invention include holographic in-scan correctors.

Figure 9:
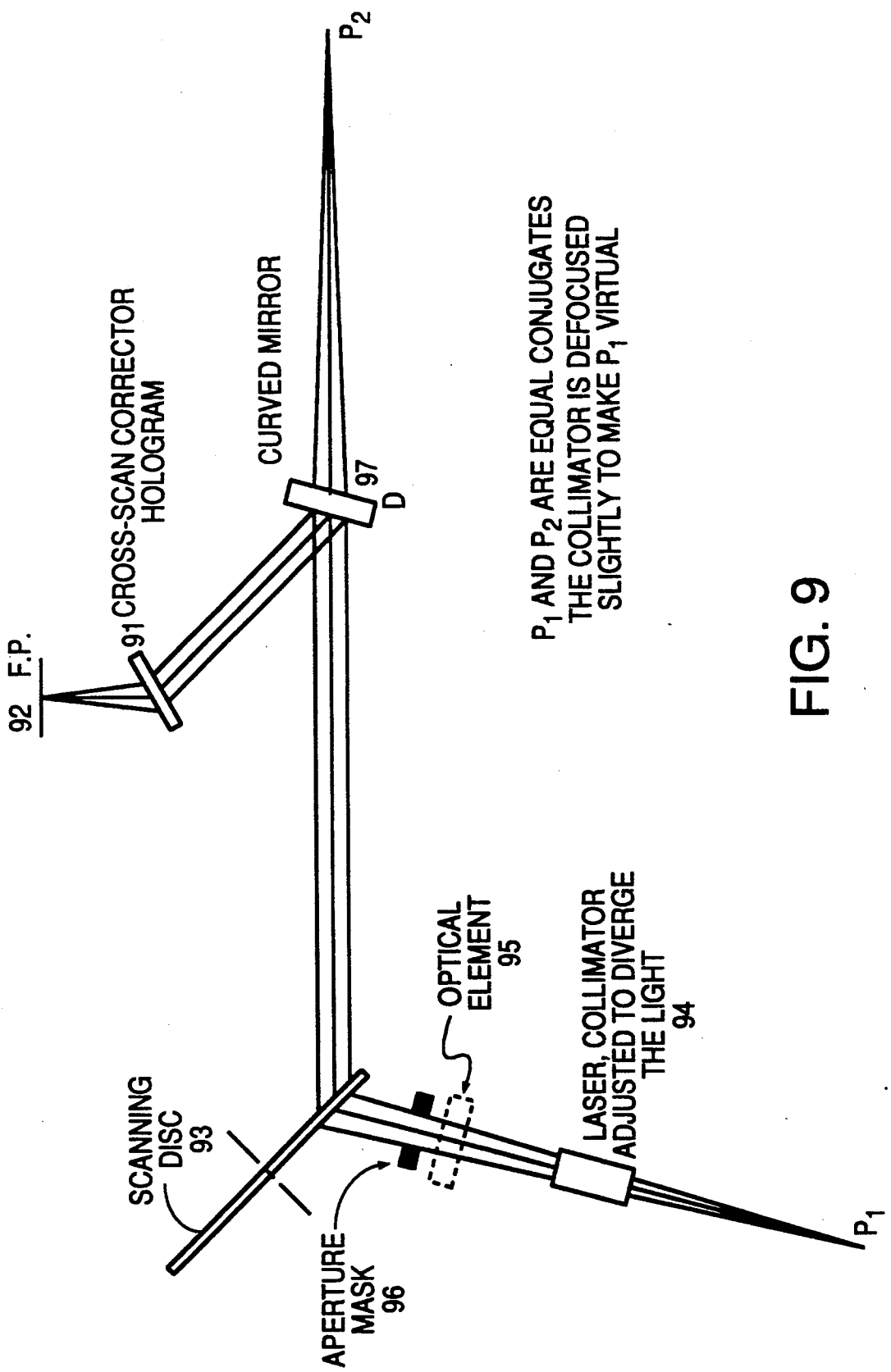
FIG. 9 illustrates one embodiment of the present invention which includes correction of cross-scan errors by placing a hologram near the focal plane.
Figure 10:
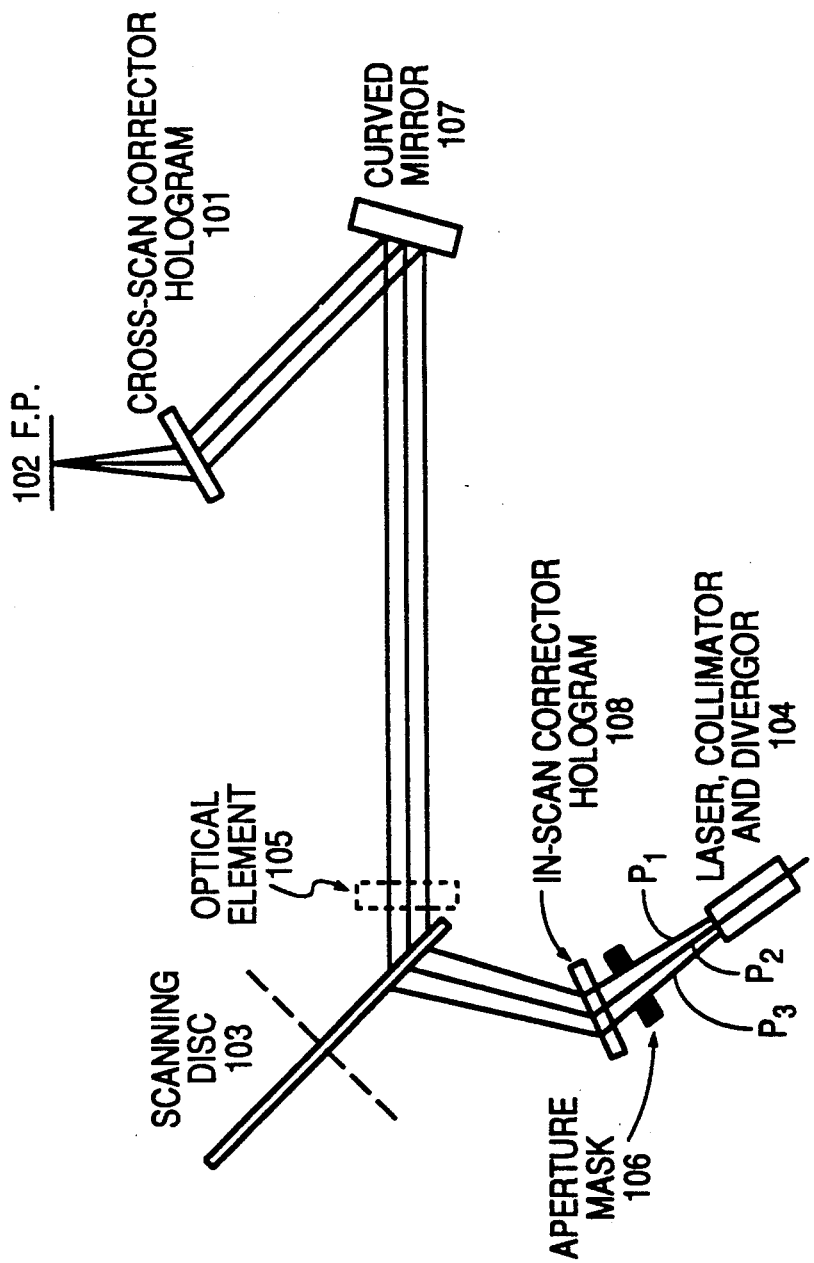
FIG. 10 illustrates another embodiment which includes an in-scan correction hologram.

Cross-scan errors may also be corrected by placing post-scan holograms 91 and 101 (hereinafter the cross-scan correctors) near the focal plane, as seen in FIGS. 9 and 10, respectively. These cross-scan correctors have power in the cross-scan, but not in the in-scan meridian. Their effects are similar to a cylinder with the zero power axis parallel to the scan line. The cross-scan corrector, 91 or 101, has a dispersive component which diffracts the beam. The cross-scan corrector is positioned to cause the light, as a result of this component addition, to fall at normal incidence on the focal plane (92 or 102 of FIGS. 9 and 10, respectively).

As a result of this dispersive component, the beam is now stigmatic, i.e., the focal plane for the cross-scan meridian is not coincident with that of the in-scan meridian. To correct this, three alternative solutions are possible.

First, an optical element 95 or 105 can be placed near the scanning disc, as in FIGS. 9 and 10, respectively. As FIG. 11c shows, this optical element 115 has positive cylindrical power which introduces an astigmatism which corrects for the stigmatism created by the cross-scan corrector 111. The amount of power required in the cylinder is determined by the size of the major axis of the elliptical spot compared to the minor axis and the distance of the cylinder to the focal plane according to the equation $$\frac{1}{f_1} + \frac{1}{f_2} = \frac{1}{f}$$

where $f_1$ is the focal length of the stigmatic component in the system before the optical element, $f_2$ is the focal length of the optical element, and f is focal length of the combination of $f_1$ and $f_2$. The sum of this cylindrical power and the power of the cross-scan corrector brings the two focal planes, $FP_1$ and $FP_2$, of the cross-scan and in-scan meridian into coincidence.

Another alternative eliminates the added optical element near the scanning disc, and instead makes use of a radially symmetric laser collimator. Note that the collimators 94 and 104 in FIGS. 9 and 10 are, in general, not circularly symmetric but contain a cylindrical component to accommodate the radiation pattern from the laser diode of this class. The radiation pattern is characterized by an angle of about 20 degrees in one meridian and about 30 degrees in the orthogonal meridian resulting in an elliptical beam cross-section. Since optical systems, in general, must have circular cross-section input beams, then a means for converting this ellipse to a circle is necessary. Generally, this conversion means comprise either a cylindrical component placed in the collimator or a pair of prisms mounted therein. However, this invention can make use of an uncorrected beam, i.e., a stigmatic beam emerging from an uncorrected collimator. Since the laser beam is already astigmatic, this becomes an advantage; the laser is mounted so that the elliptical emergent beam cross-section is oriented in a direction to provide the required astigmatism for substantially reducing that caused by the cross-scan corrector. Specifically, the laser is turned so that the emerging ellipse has its major axis along the groove direction.

In a third embodiment, the degree of astigmatism can be adjusted to cancel that produced by the cross-scan corrector. The adjustment involves the degree of astigmatism correction specified for in the collimator lens, together with the degree of natural astigmatism in the laser. This is desirable since it enables the system to use different laser types having different amounts of astigmatism.

In an alternative implementation of the present invention, as seen in FIG. 9, the in-scan corrector is removed and the cross-scan corrector 91 is moved to a position of greater proximity to the focal plane 92. As before, the cross-scan corrector acts in a manner similar to a cylindrical lens of zero power in the in-scan meridian and strong power (for example, 30 diopters) in the cross-scan meridian. Placing the cross-scan corrector at about 21 mm or less from the focal plane 92 eliminates cross-scan errors and reduces the dot dimension in the vertical direction, but not in the orthogonal direction. The dot shape can be corrected by the introduction of astigmatism with the use of a cylinder 95 a previously mentioned, and/or by adjusting the system aperture shape with an aperture mask 96 so that the Numerical Aperture (NA) is made smaller in the cross-scan meridian. The aperture mask can be fabricated out of any opaque or relatively opaque material common in the industry.

Since the system is diffraction limited, an aperture reduction causes a larger vertical spot dimension. The cross scan corrector 91 images the deflector aperture, i.e., the aperture of aperture mask 96, on the focal plane 92. This implementation can be used in those applications in which some in-scan error can be tolerated, but not in very high resolution systems, such as those requiring 900 to 1200 dots per inch where in-scan errors are usually specified to be on the order of $\frac{1}{4}$ to $\frac{1}{2}$ dot.

Figures 12A, 12B:
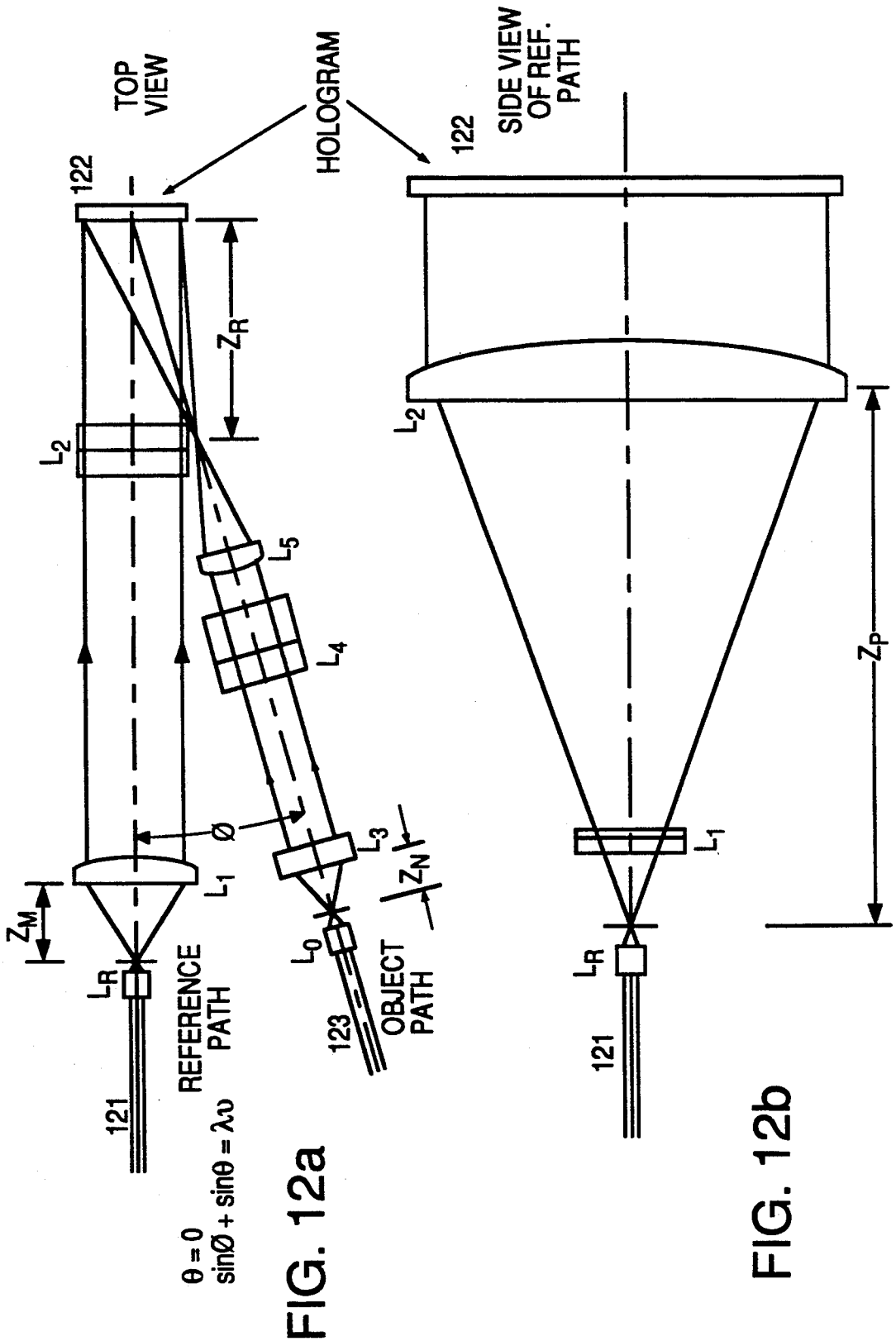

The configuration for recording the cross-scan corrector is shown in FIG. 12a. The HeCd laser (not shown) emits a light beam at wavelength $\lambda = 441.6$ mm. A beam splitter splits this light beam into two beams. One beam becomes the reference beam 121. The second beam becomes the object beam 123. The reference beam 121 is expanded by the microscope objective $L_R$ to fill lens $L_1$. Then, the reference beam 121 is collimated in both the vertical and horizontal planes by lens $L_1$ and $L_2$. In this way, light is conserved. FIG. 12b shows a side view of the reference beam. The width and height of lenses $L_1$ and $L_2$ are determined by the size of the hologram 122 to be recorded.

Figure 13:
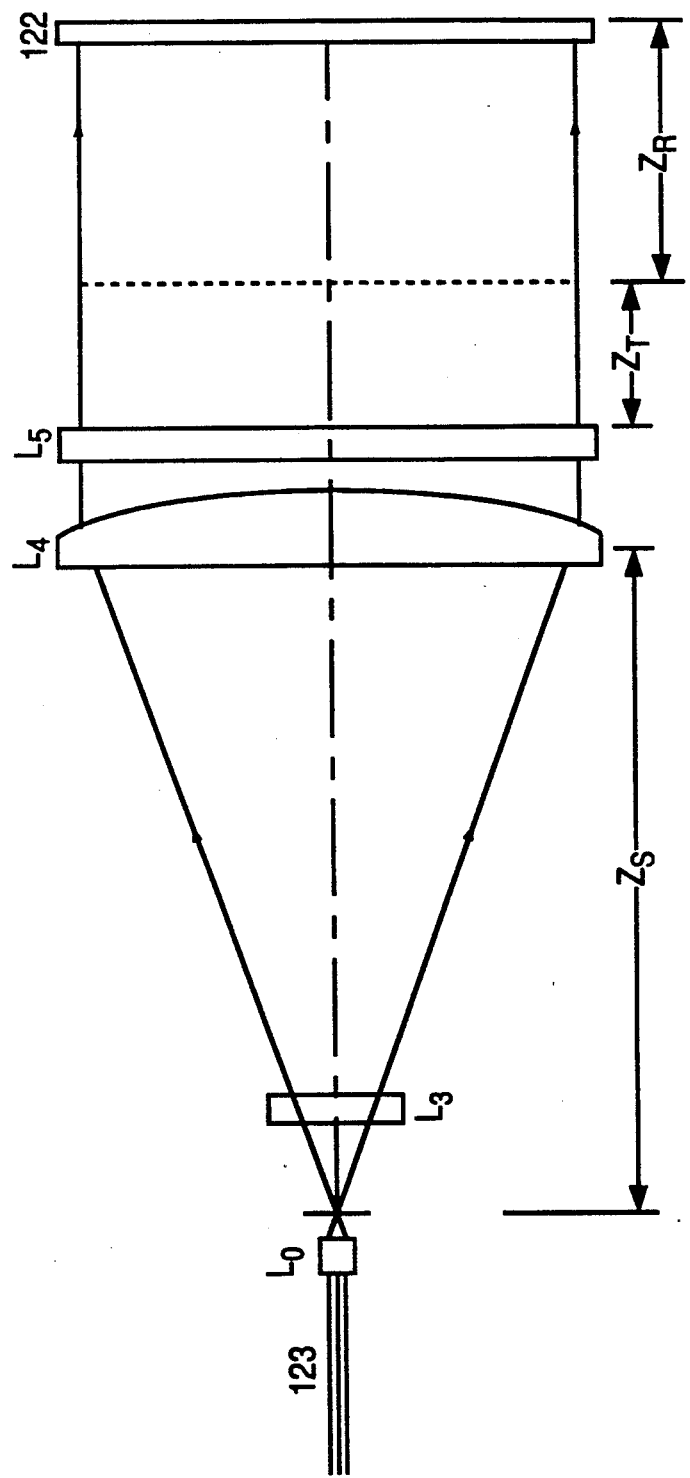

As FIG. 13 shows, the object beam 123 is in a path containing lenses $L_3$ and $L_4$ which produce a collimated beam in the horizontal plane but only $L_4$ produces a collimated beam in the vertical plane. $L_5$ focuses the collimated light to a line focus at a distance of $Z_R$ from the hologram. After $Z_R$, the beam then expands in the horizontal plane, but remains collimated in the vertical plane. The fringe pattern produced on the hologram 122 has a Fresnel distribution, i.e., higher spatial frequency at the edge fringes than at the middle, in the horizontal plane and has straight fringes in the vertical direction. The equations for obtaining the desired distribution are well known to those in the art. $Z_n$ is the focal length of lens $L_3$. The focal length of $L_4$ is $Z_s$ and that of $L_5$ is $Z_t$.

These distances must be adjusted for the thickness of $L_1$. Although holograms having a Fresnel distribution have been made before, its use as a cross-scan corrector is completely new. The embodiment of the present invention requires a cross-scan corrector with two properties. One, it must focus light in one meridian, but not the orthogonal one. Two, it must have a particular dispersion to correct for cross-scan errors. A glass cylinder could satisfy the first property, but not the second. If a glass cylinder were used, an additional prism would be required in order to provide the correct dispersion. Hence, these two elements of expensive glass have been replaced with one inexpensive hologram having a Fresnel distribution.

Since the pre-deflection hologram is a plane constant frequency grating, ordinary standard procedures are used in its recording.

FIGS. 9 and 10 show the layout of the complete system showing the correctors. The optical element 95 or 105 positioned by the scanning disc 93 or 103, in addition to its dispersive power, also has focusing power in the cross-scan meridian, but none in the in-scan direction. The optical element 95 or 105 is oriented so that its dispersive power subtracts from the system dispersion error. FIG. 10 illustrates the principle ray paths $P_1$, $P_2$, $P_3$ as a function of different wavelengths.

In the absence of optical element 111, the focal plane, as shown in FIG. 11a, is positioned at $FP_1$. $FP_1$ is a property of the uncorrected system. When element 111 is inserted, a second focal plane is at $FP_2$. Optical element 111 has a positive cylindrical power and is inserted at a distance $l_1$ from focal plane $FP_1$. One embodiment of this invention uses a cylinder for an optical element. The power of cylinder 111 results in convergance of the rays on $FP_2$, but only in the power meridian. The rays in the cylinder's zero power are still converged at $FP_1$.

If a circular focused spot is desired, these focal planes $FP_1$ and $FP_2$ should coincide. The distance between $FP_1$ and $FP_2$ is approximately equal to the focal length $f_{cy}$ of cylinder 111. Hence, $f_{cy} \approx l_1 - l_2$. The actual distance is modified slightly because of the original power of the system before the cylinder, but this original power is negligible in comparison with $f_{cy}$ and therefore does not affect the separation of the two planes. For applications in those laser printer systems which use electronically enhanced resolution, an elliptical spot is needed. With an elliptical spot, the major axis is vertical and slightly larger than the line interval to ensure that no white paper will show through when black multiple horizontal lines are written.

The minor axis dimension is made less than the horizontal dot interval so that vertical lines of smaller thickness than a dot width may be written. Thicker lines require longer "on times", which is a software function.

Figure 14:
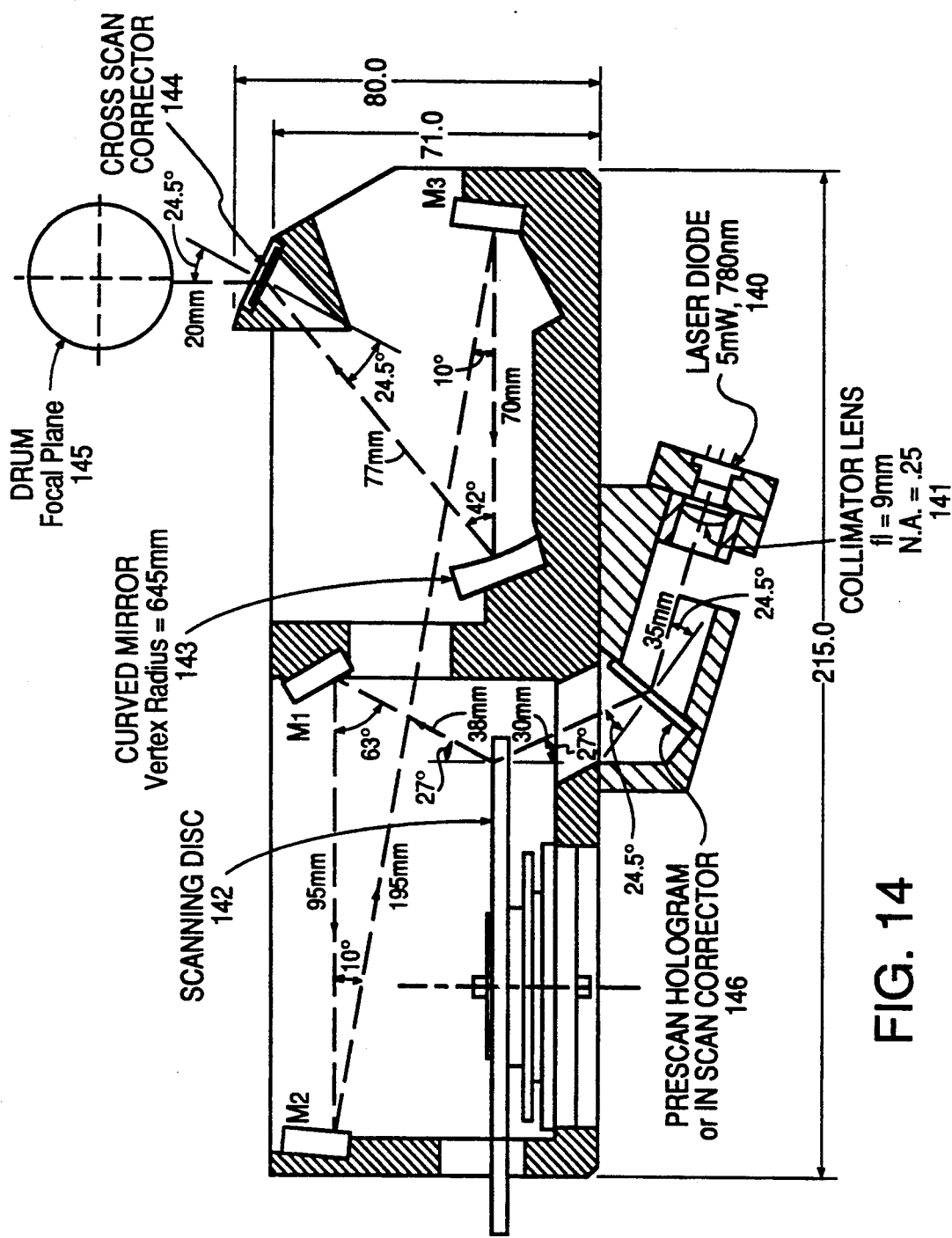
FIG. 14 shows a side view of an actual embodiment of the present invention.
Figure 15:
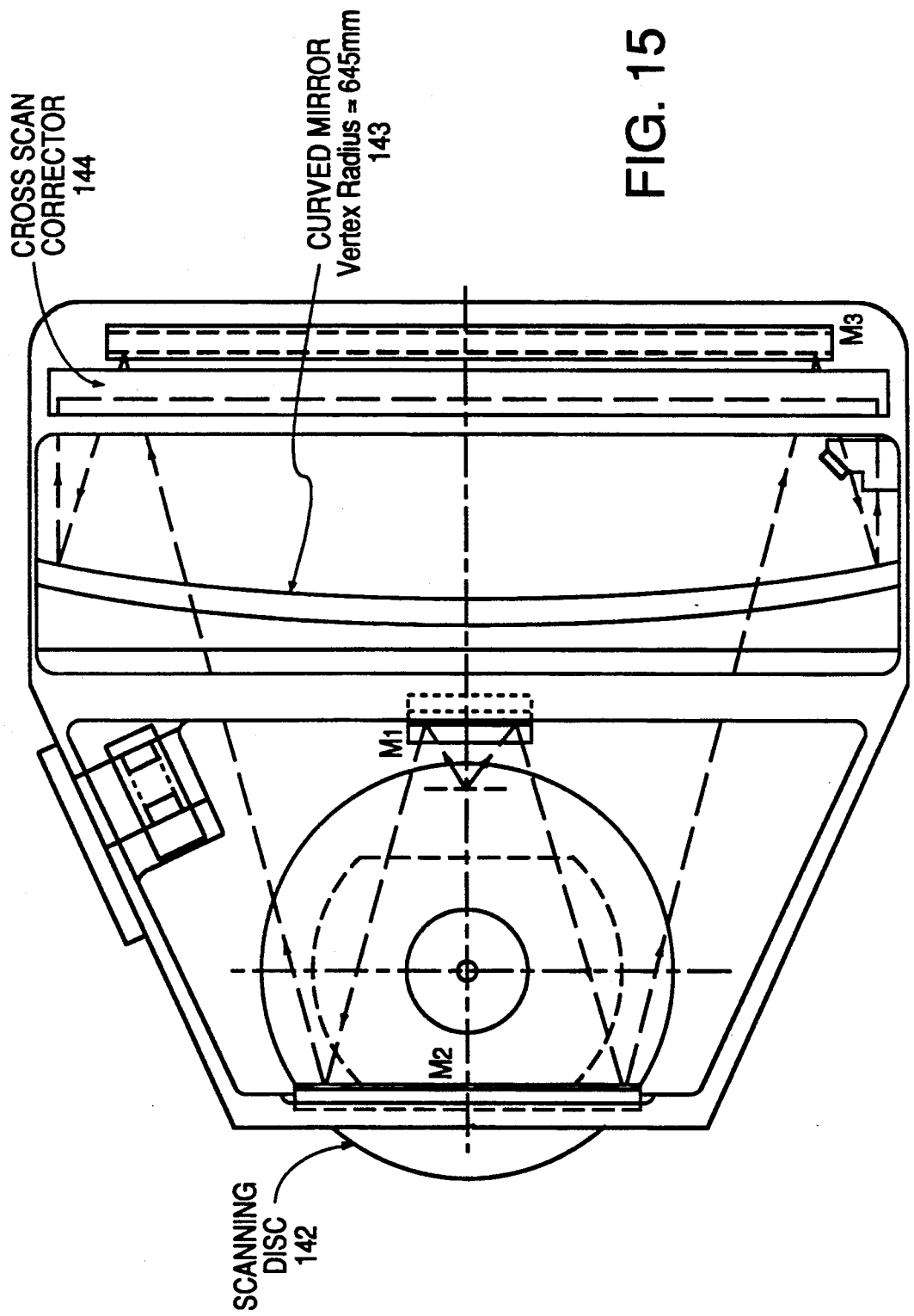
FIG. 15 shows a top view of an actual embodiment of the present invention.

FIGS. 14 and 15 illustrate an actual scanning system which embodies the present invention. In FIG. 14, an index-guided laser diode 140 puts out 5 mW of power and emits light at a wavelength of approximately 780 nm which is collimated by collimating lens 141. This collimator lens has a focal length of 9 mm and has a Numerical Aperture of 0.25. This collimation beam is defocused slightly giving rise to a curved rather than a plane wavefront. This is done to satisfy the need for a finite distance virtual point source. This reconstruction beam is then diffracted by the in-scan corrector 146 to pass through the spinning scanning disc 142. (The spatial frequency of the in-scan corrector, in this embodiment, has already been determined to be equal to 1339.7 cycles per millimeter.) Scanning disc 142 diffracts and focuses the light beam. This light beam is then reflected off a series of folding mirrors $M_1$, $M_2$, and $M_3$ which serve to make the scanning system as compact as possible. Mirrors $M_1$, $M_2$, and $M_3$ are all plane flat mirrors. After reflection off $M_3$, the light beam is reflected off curved mirror 143 which has a vertex radius of 645 mm onto the cross-scan corrector 144. Referring back to FIGS. 12a, 12b, and 12c, the cross-scan corrector was recorded with the following paramters. $L_R$ is a microscope objective of 40x with a focal length of 4 millimeters. The angle $\phi$ formed by the reference and object path is 27.2 degrees. $L_0$ is a microscope objective of 40x with a focal length of 4 millimeters. $L_3$ is a lens with a focal length of 15.24 millimeters, while $L_4$ has a focal length of 500 millimeters. The dimension of the beam from $L_3$ to $L_4$ is 7.62 millimeters. $L_5$ is a lens with a focal length of 80 millimeters. $Z_T$, as seen in FIG. 13, is 80 millimeters and $Z_R$ is 272 millimeters. The distance between $L_4$ and $L_5$ does both planes. $Z_p$, as illustrated in FIG. 12b, is 500 millimeters. $L_1$ has a focal length of 50 millimeters while $L_2$ has a focal length of 500 millimeters. Using the preceding parameters yields a hologram with a spatial frequency of 1035 cycles per millimeter in the center. This cross-scan corrector diffracts the beam onto focal plan 145. All distances illustrated in FIGS. 14 and 15 are in millimeters. FIG. 16 lists the specifications for a 300 DPI module and deflection errors including bow and linearity.

In accordance with the present invention, holograms can be replicated on plastic which further reduces the cost of the scanning system. The holograms can be replicated on a thin transparent plastic with a diameter and thickness comparable to the substrate of a compact audio disc. While the dimensions of a compact disc are satisfactory, they represent one of many possible implementations, e.g., the disc may be thin such as a floppy disc. The diameter is not confined to 5 inches but may be sized according to the application—from 1 inch in diameter to 10 inches in diameter. The thickness of the disc may be varied to suit the application. Additionally, the substrate material may be virtually any transparent material such as glass, plastic, etc.

The process of replicating a hologram comprises the following steps.

(a) Photoresist is spin-coated onto a flat glass circular substrate. A coating thickness of 2 to 4 micrometers is applied. The coating must be free from ripples or other coating artifacts. One embodiment of the present invention uses Shipley's Microposit 1400-37 as the photosensitive material. Other comparable photosensitive materials may also be used.

(b) This coated disc is baked according to the photoresist manufacturer's instructions.

(c) The disc is then mounted on a rotary table which is situated on the holographic recording table.

(d) A mask is placed to shield the disc from laser light except through an aperture in the mask having the shape and dimensions of the facet to be recorded. FIG. 17 shows one embodiment of a scanning disc with six facets. The scanning disc 183 illustrated in FIG. 18 has an outside diameter of 120 mm. The six facets A through F on the scanning disc 183 have an outer edge 182 for a hologram track. This outer edge has a diameter of 113 mm on the scanning disc. The inner track 181 for the hologram track has a resulting diameter of 55 mm. The six radial members 180 extending from the inner edge 181 to the outer edge 182 of the hologram track establish the boundaries between the hologram facets A through F. Because the six facets are equally sized, the resulting angle formed by two boundaries 180 would be 60°. An illustration of a typical fringe pattern 184 is seen in facet F.

(e) An exposure of one facet is made using the recording geometry of FIG. 3.

(f) The rotary table is then turned through a precise angle such that the next exposed facet abuts the preceding one. These steps are repeated until all the facets are recorded.

(g) The disc is removed to a developing station and developed in Shipley 606 developer, or another comparable unit, for a period of time, roughly for thirty seconds, which results in the groove structure having the correct depth as monitored during developing by a helium-neon laser. The disc is then rinsed for approximately five seconds in distilled water and dried with a blast of standard dry nitrogen.

(h) The disc is then inspected and electroplated by a process generally used for stamping discs for phonographs. About 0.01 inches of nickel is built up.

(i) The nickel is separated from the glass substrate by immersion in a solvent. One embodiment of this invention uses acetone (reagent grade) as the solvent. The modulation which was on the developed hologram as thickness variations is now on the nickel surface. The resulting disc is a stamping master.

(j) A polycarbonate or PMMA disc, molded from a C-D press, is coated with a U.V. polymerizable transparent plastic dry film which bonds to the polycarbonate like one-sided adhesive tape to a thickness of approximately 35 microns.

(k) The coated disc is then placed in a stamping press which forces the stamping master into the soft plastic. At this point the disc is irradiated with a standard arc lamp with ultra violet light for approximately 10 seconds causing it to harden through polymerization.

(l) The press is opened and the disc is removed. The finished scanning disc is now ready to be used in a holographic scanning system.

Prior art replication has been done by embossing directly into the substrate material. See, for example, R. Bartolini et al., "Embossed Holograms Motion Pictures," Applied Optics (Vol. 9, p. 2283) 1970. In accordance with the present invention, embossing, step k, is preceded by coating the substrate, step j, with a U.V. polymerizable transparent plastic.

This coating has two important advantages over the prior art. First, the coating has nearly the same refractive index as the polycarbonate substrate which prevents loss of light due to reflection. Second, the coating actually penetrates into the recesses of the very deep grooves, i.e., h/d=1.45, yet releases readily from the stamper. One example of a suitable U.V. polymerizable transparent plastic has been developed by E. I. duPont de Nemours & Co., Barley Hill Plaza of Wilmington, Del. 19898 and is available as DuPont Dry Photopolymer Film #2. The preferred embodiments of the present invention use this particular plastic.

This system provides several advantages.

1. This scanner employs a spinning holographic disc with an array of holographic elements (i.e., facets in one embodiment) about its periphery which not only deflect the incident laser beam into a precise straight line, but also focuses the beam to a small spot. This structure eliminates the need for conventional corrective optics and lenses to process and focus the beam.
2. The scanner can use a light source that is not strictly monochromatic, i.e., semi-conductor lasers of the very inexpensive variety. This class of lasers is characterized by wavelength drifts with temperature. The change in wavelength occurs as irregular steps called "mode hops". The ability to use lasers of this class eliminates the need for the more expensive monochromatic lasers such as He-Ne, He-Cd, argon Ion, or neodymium lasers, all of which are incapable of the internal modulation necessary for use in holographic or conventional printers. Such systems need an expensive external modulator.
3. The scanner produces a constant velocity scan of equal to or higher precision than any in known state of the art systems suitable for office laser printing applications.
4. A holographic scanner system which produces a scanning spot of constant dimensions across the line where the shape may be adjusted from circular to elliptical by the use of an aperture mask. The elliptical spot is desirable in enhanced resolution applications. The use of a system aperture mask allows the spot shape to b manipulated.
5. A holographic scanner which has a flat field.
6. A fully achromatized holographic scanner with both the in-scan and cross-scan directions corrected for all the possible wavelength drift and mode hop intervals of the least expensive semiconductor laser available on the market today.
7. A laser scanner system which has a much lower cost than any such system available at the present state of the art.
8. A high resolution holographic scanner system which is inherently diffraction limited without resort to using aberration correcting elements to nullify the Seidel type aberrations incurred by recording the hologram at a different wavelength from that used in read out.
9. A holographic scanner system which is free from detectable disc wobble errors.
10. A holographic scanner system which uses a curved mirror to simultaneously achieve (a) bow correction, (b) flat field and (c) linearity.
11. A holographic scanner which can use scanning discs replicated on virtually any transparent material.

Other variations of the scanner system will be obvious to those skilled in the art in view of this description.

We claim:

1. A system for forming an image on a focal plane comprising:
   means for emitting a light beam;
   a first hologram placed relative to said means for emitting to deflect and focus said light beam onto said focal plane;
   a second hologram for correcting cross-scan error of said light beam on said focal plane; and
   a third hologram for correcting in-scan error of said light beam on said focal plane.

2. Structure of claim 1 wherein said means for emitting is a laser diode.

3. Structure of claim 2 wherein said laser diode approximates a point light source positioned to allow said first hologram to diffract substantially all of said light beam into one first order.

4. Structure of claim 1 wherein said first, second, and third holograms are developed by holographic processes.

5. Structure of claim 1 wherein said light beam is deflected by said first hologram, thereby forming an input angle with said first hologram and an output angle with said first hologram.

6. Structure of claim 5 wherein said input and output angles are equal.

7. Structure of claim 6 wherein said input and output angles are in the range of about 20 degrees to about 60 degrees.

8. Structure of claim 1 wherein said first hologram is a transmission hologram.

9. Structure of claim 1 wherein said first hologram is comprised of a transparent material.

10. Structure of claim 1 wherein said third hologram for correcting in-scan error and said second hologram for correcting cross-scan error correct placement of said light beam because of drift and mode hopping in a frequency of said means for emitting.

11. Structure of claim 10 further comprising means for reflecting said light beam to correct for bow, and to optimize linearity and flatness.

12. Structure of claim 11 wherein said means for reflecting is a curved mirror.

13. A system for reconstruction of an image onto a focal plane comprising:
    means for emitting a light beam; and
    a transmission hologram positioned in operative relation to said means for emitting to deflect and focus said light beam onto said focal plane,
    wherein said transmission hologram has a groove height and a grating constant, and further wherein the ratio of said groove height to said grating constant is approximately 1.44.

14. A system for forming an image on a focal plane comprising:
    means for emitting a light beam;
    a hologram placed relative to said means for emitting to deflect and focus said light beam onto said focal plane;
    means for correcting cross-scan error of said light beam on said focal plane; and
    means for correcting in-scan error of said light beam on said focal plane,
    wherein said hologram is a reflection hologram.

15. A system for reconstruction of an image onto a focal plane comprising:
    means for emitting a light beam; and
    a reflection hologram positioned in operative relation to said means for emitting to deflect and focus said light beam onto said focal plane,
    wherein said reflection hologram has a groove height and a grating constant, and further wherein the ratio of said groove height to said grating constant is approximately 0.36.

16. A system for forming an image on a focal plane comprising:
    means for emitting a light beam;
    a hologram placed relative to said means for emitting to deflect and focus said light beam onto said focal plane;

means for correcting cross-scan error of said light beam on said focal plane; and means for correcting in-scan error of said light beam on said focal plane, wherein said means for correcting in-scan error comprises a prism disposed before said hologram, and wherein said prism refracts said light beam onto said hologram.

17. A system for reconstruction of an image onto a focal plane comprising:

means for emitting a light beam;

a disc hologram positioned in operative relation to said means for emitting to deflect and focus said light beam onto said focal plane;

a plurality of holograms placed relative to said disc hologram to correct placement of said light beam because of drift and mode hopping in a frequency of said means for emitting;

means for reflecting said light beam placed relative to said disc hologram to correct for bow, and to optimize linearity and flatness; and means for collimating said light beam from said means for emitting, wherein one of said plurality of holograms is positioned near said focal plane.

18. Structure of claim 17 further comprising an optical element positioned near said disc hologram, wherein said one of said plurality of holograms produces a stigmatic beam, and wherein said optical element substantially corrects said stigmatic beam.

19. Structure of claim 18 further comprising an aperture mask for adjusting an effective system aperture.

20. A system for reconstruction of an image onto a focal plane comprising:

means for emitting a light beam; and a disc hologram positioned in operative relation to said means for emitting to deflect and focus said light beam onto said focal plane;

a plurality of holograms placed relative to said disc hologram to correct placement of said light beam because of drift and mode hopping in a frequency of said means for emitting;

means for reflecting said light beam placed relative to said disc hologram to correct for bow, and to optimize linearity and flatness; and means for collimating said light beam from said means for emitting, wherein one of said plurality of holograms is positioned before said disc hologram and has a spatial frequency that provides a predetermined angular dispersion of said light beam onto said disc hologram.

21. Structure of claim 20 wherein another of said plurality of holograms is positioned after said disc hologram and before said focal plane to diffract said light beam thereby producing a stigmatic beam.

22. Structure of claim 21 further comprising an optical element positioned near said disc hologram to produce an astigmatic beam to correct for said stigmatic beam.

23. Structure of claim 21 wherein said means to collimate is a radially symmetric laser collimator which substantially cancels said stigmatic beam.

24. Structure of claim 21 wherein said means for emitting has a natural astigmatism and said collimating means has an astigmatism, and further wherein said means for emitting and said collimating means in combination substantially cancel said stigmatic beam.

25. A method of forming an image on a focal plane comprising:

emitting a light beam from a point source;

positioning the center axis of said light beam at an angle to a first hologram which deflects substantially all of said light beam into one first order light beam;

focusing said light beam onto said focal plane by passing said light beam through said first hologram;

correcting for in-scan error of said light beam on said focal plane with a second hologram; and correcting for cross-scan error of said light beam on said focal plane independently from said in-scan error with a third hologram.

26. Method of claim 25 further comprising collimating said light beam prior to said focusing with said first hologram.

27. Method of claim 26 further comprising, reflecting said light beam to correct for bow and optimize linearity and flatness.

28. A method of reconstructing an image on a focal plane comprising:

emitting a light beam from a point source;

positioning the center axis of said light beam at an angle to a first hologram which permits diffraction of substantially all of said light beam into one first order with said first hologram;

focussing and deflecting said light beam onto said focal plane with a second hologram;

collimating said light beam prior to said first hologram;

reflecting said light beam to correct for bow and optimize linearity and flatness; and diffracting said light beam with a third hologram after said deflecting by said second hologram.

29. Method of claim 28 wherein said diffraction of said light beam with said first hologram produces a first dispersion, said focussing and deflecting with said second hologram produces a second dispersion, and diffracting said light beam with said third hologram produces a third dispersion, and wherein said first, second, and third dispersions, in combination, provide an achromatized system.

30. Method of claim 28 further comprising creating a stigmatic light beam with said third hologram, and positioning an optical element before said first hologram to correct for said stigmatic light beam.

31. Method of claim 30 further comprising adjusting a system aperture with an aperture mask positioned before said first hologram.

32. Method of claim 29 wherein said third hologram causes said light beam to fall at normal incidence to said focal plane.

33. Method of claim 32 further comprising creating an astigmatic light beam with an optical element positioned after said first hologram to correct for said stigmatic light beam.

34. Method of claim 32 further comprising creating an astigmatic light beam with a radially symmetric laser collimator positioned before said first hologram, and correcting said astigmatic light beam with said third hologram.

* * * * *

UNITED STATES PATENT AND TRADEMARK OFFICE
CERTIFICATE OF CORRECTION

PATENT NO. : 5,182,659
DATED : January 26, 1993
INVENTOR(S) : Burton R. Clay, et al It is certified that error appears in the above-indentified patent and that said Letters Patent is hereby corrected as shown below:

Col. 2, line 48 (second occurence), and Col. 11, line 3; delete "a" and insert --an--.

Col. 2, line 49; Col. 10, lines 29 and 46; and Col. 11, line 3, delete "stigmatic" and substitute --astigmatic--.

Col. 2, lines 51, 54, 58, 62 and 67; and Col. 10, line 37 delete "stigmatism" and insert --astigmatism--.

In The Drawings

Figure 11c, delete "STIGMATISM" and insert --ASTIGMATISM--.

Figure 16, delete "39.37" and insert --3,937--.

Signed and Sealed this

Twelfth Day of April, 1994

Attest:

BRUCE LEHMAN

*Attesting Officer*   *Commissioner of Patents and Trademarks*